US012743502B2

(12) United States Patent
Petersen et al.

(10) Patent No.: US 12,743,502 B2
(45) Date of Patent: Sep. 22, 2026

(54) SYSTEMS, METHODS, AND STORAGE MEDIA FOR CREATING AND MANAGING AN ENTITY-ORIENTED DATA FABRIC IN A PROTECTED ENVIRONMENT

(71) Applicant: Radicl Defense, Inc., Boulder, CO (US)

(72) Inventors: Christopher Petersen, Niwot, CO (US); Matthew Petersen, Loveland, CO (US); Frank Hassanabad, Longmont, CO (US)

(73) Assignee: Radicl Defense, Inc., Boulder, CO (US)

( * ) Notice: Subject to any disclaimer, the term of this patent is extended or adjusted under 35 U.S.C. 154(b) by 95 days.

(21) Appl. No.: 18/771,993

(22) Filed: Jul. 12, 2024

(65) Prior Publication Data

US 2026/0017364 A1 Jan. 15, 2026

(51) Int. Cl.
*G06F 21/53* (2013.01)

(52) U.S. Cl.
CPC ........ *G06F 21/53* (2013.01); *G06F 2221/033* (2013.01)

(58) Field of Classification Search
CPC ........................... G06F 21/53; G06F 2221/033
USPC ........................................................... 726/22
See application file for complete search history.

(56) References Cited

U.S. PATENT DOCUMENTS 8,925,089 B2 * 12/2014 Sallam .................. G06F 21/568
726/22
10,291,648 B2 * 5/2019 Giura .................. G06F 9/45558
10,367,841 B2 * 7/2019 Arnaldo ................... G06N 3/08
10,438,001 B1 * 10/2019 Hariprasad ........... G06F 21/577
10,924,503 B1 * 2/2021 Pereira ..................... H04L 63/20
11,425,161 B2 * 8/2022 Solis Agea ............ G06N 20/00
11,487,873 B2 * 11/2022 Ramzan ................ G06F 9/5027
11,522,873 B2 * 12/2022 Chu ......................... G06F 18/22
11,647,032 B2 * 5/2023 Lee ..................... H04L 63/1425
706/12
11,743,282 B1 * 8/2023 Torkamani ............. G06N 20/00
726/25

(Continued)

OTHER PUBLICATIONS

Mohit Sewak; Deep Reinforcement Learning for Cybersecurity Threat Detection and Protection: A Review; SPringer: year:2021; pp. 1-30.*

*Primary Examiner* — Monjur Rahim
(74) *Attorney, Agent, or Firm* — NOD Law PC

(57) ABSTRACT

Systems, methods, and storage media for creating an entity-oriented data fabric (EODF) for a protected environment (PE) are described, the system configured to identify a plurality of entities associated with the PE; obtain first data associated with at least one entity from the PE; identify a relationship with at least one other entity for each of the entities; create a plurality of objects, where each of the plurality of objects is associated with one or more entities and a portion of the first data; store first information related to the entities, first data, relationships, and the objects; create the EODF for the PE, the EODF comprises a data framework for providing a unified view of the plurality of entities and relationships, the EODF facilitates discovery of compromised entities or entities vulnerable to being compromised; and providing a visualization for displaying the first information on a user interface.

21 Claims, 20 Drawing Sheets

(56) References Cited

U.S. PATENT DOCUMENTS

| | | | | |
|---|---|---|---|---|
| 11,775,639 | B2 * | 10/2023 | Collier | G06F 21/566 726/22 |
| 11,810,012 | B2 * | 11/2023 | Poirel | G06N 7/01 |
| 2012/0255003 | A1 * | 10/2012 | Sallam | G06F 21/554 726/23 |
| 2012/0255012 | A1 * | 10/2012 | Sallam | G06F 21/554 726/23 |
| 2013/0312099 | A1 * | 11/2013 | Edwards | G06F 21/554 726/24 |
| 2014/0298460 | A1 * | 10/2014 | Xue | H04L 63/1425 726/23 |
| 2016/0119365 | A1 * | 4/2016 | Barel | G06F 16/95 726/12 |
| 2017/0118236 | A1 * | 4/2017 | Devi Reddy | H04L 63/1425 |
| 2017/0180416 | A1 * | 6/2017 | Giura | G06F 9/45558 |
| 2020/0233955 | A1 * | 7/2020 | Ramzan | G06F 21/554 |
| 2021/0326438 | A1 * | 10/2021 | Dichiu | G06F 21/552 |
| 2022/0174092 | A1 * | 6/2022 | Farjon | G06F 40/221 |
| 2023/0022070 | A1 * | 1/2023 | Zaloum | G06F 3/017 |
| 2023/0114821 | A1 * | 4/2023 | Thomas | H04L 63/145 726/23 |
| 2023/0319100 | A1 * | 10/2023 | Beauchesne | H04L 63/145 726/22 |
| 2023/0325501 | A1 * | 10/2023 | Chhetri | G06F 21/53 726/24 |
| 2023/0344838 | A1 * | 10/2023 | Rao | H04L 63/1416 |
| 2023/0376594 | A1 * | 11/2023 | Dalal | G06F 21/552 |
| 2023/0396641 | A1 * | 12/2023 | Hebbagodi | H04L 63/1408 |
| 2024/0022577 | A1 * | 1/2024 | Fu | H04L 63/1425 |
| 2024/0022600 | A1 * | 1/2024 | Zhang | H04L 63/1466 |
| 2024/0126889 | A1 * | 4/2024 | Clark | G06F 21/577 |
| 2024/0320338 | A1 * | 9/2024 | Chhetri | G06N 3/0464 |
| 2025/0077673 | A1 * | 3/2025 | Portase | G06F 21/554 |
| 2025/0165616 | A1 * | 5/2025 | Cameron | G06F 21/552 |

* cited by examiner

202 Identifying a plurality of entities associated with the protected environment 204 Obtaining first data from the protected environment, wherein the first data is associated with at least one entity of the plurality of entities 206 Identifying, for each of the plurality of entities, a relationship with at least one other entity of the plurality of entities, wherein the relationship is identified at least in part on the first data 208 Creating a plurality of objects, wherein each of the plurality of objects is associated with one or more entities of the plurality of entities and at least a portion of the first data 210 Storing first information related to the plurality of entities, the first data, each relationship with at least one other entity, and the plurality of objects 212 Creating the entity-oriented data fabric in the protected environment, based at least in part on storing the first information, wherein the entity-oriented data fabric comprises a data framework for providing a unified view of at least the plurality of the entities and each relationship 214 Providing at least a portion of the first information on a computing device, wherein the providing comprises providing one or more of a visualization, a graph, and a table via a user interface (UI) on the computing device

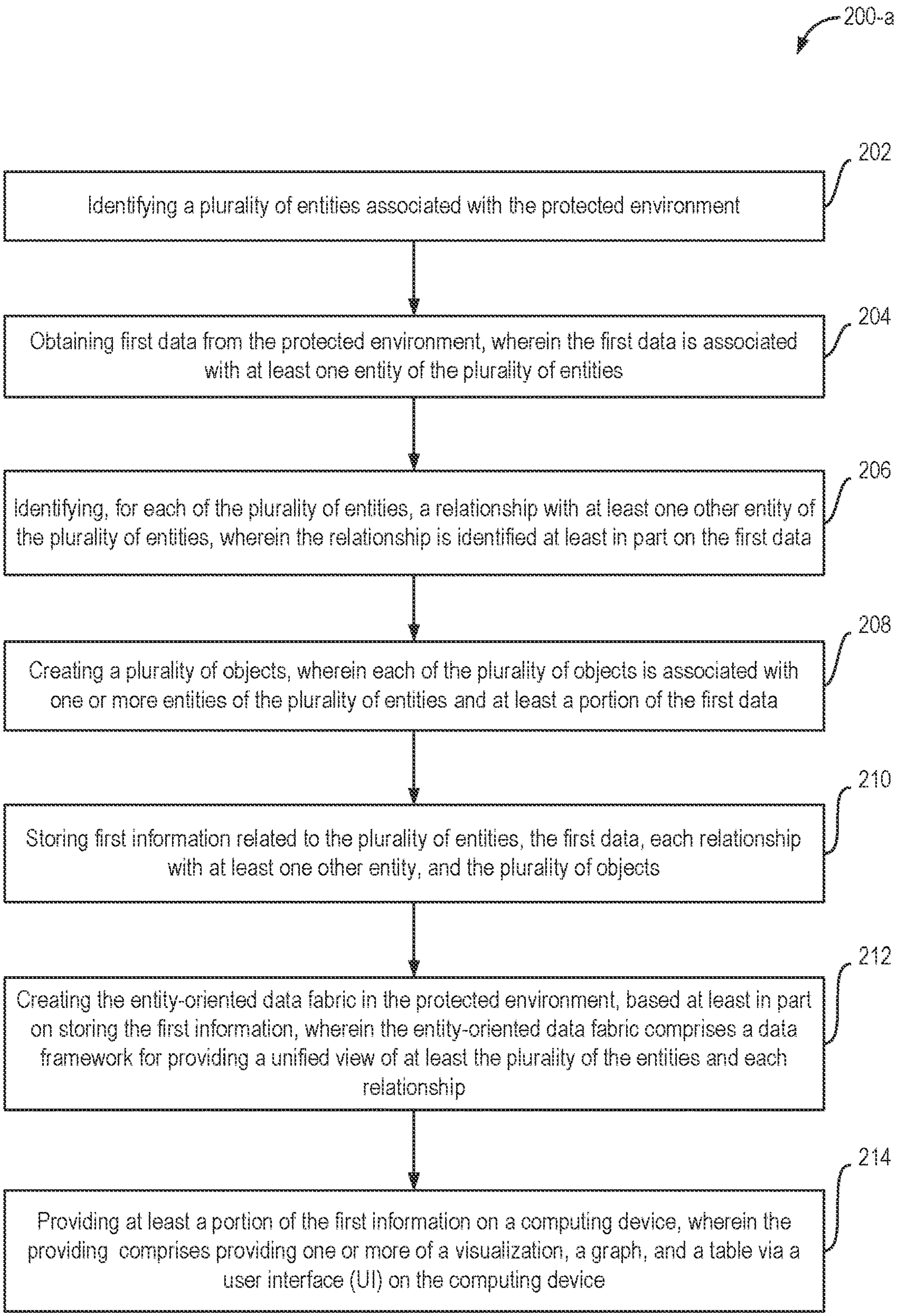

FIG. 2A 200-c

Receiving a request for retrieving, from the searchable data store, fourth information, wherein the fourth information comprises information related to one or more of a first entity, a first object, a first vulnerability report, a first threat intelligence report, an attribute of the first object, and a contextualized attribute of the first object

220

Receiving and/or Extracting Raw Data Message(s) Containing Analytics Value(s) from Multiple Information Sources 228

Preparing one or more Raw Data Objects (RDOs) from the Raw Data Message(s) 230

Creating one or more Entity Oriented Data Objects (EODOs)

Inherent Entity Extraction based on processing the one or more RDOs 232

Derived Entity Extraction and/or Derived Feature Extraction, based on processing the one or more RDOs 233

Relationship or Contextual Link(s) Extraction based on processing the one or more RDOs 234

Identifying and/or Associating Known Entities from Information Contained within Entities and/or Links 235

231

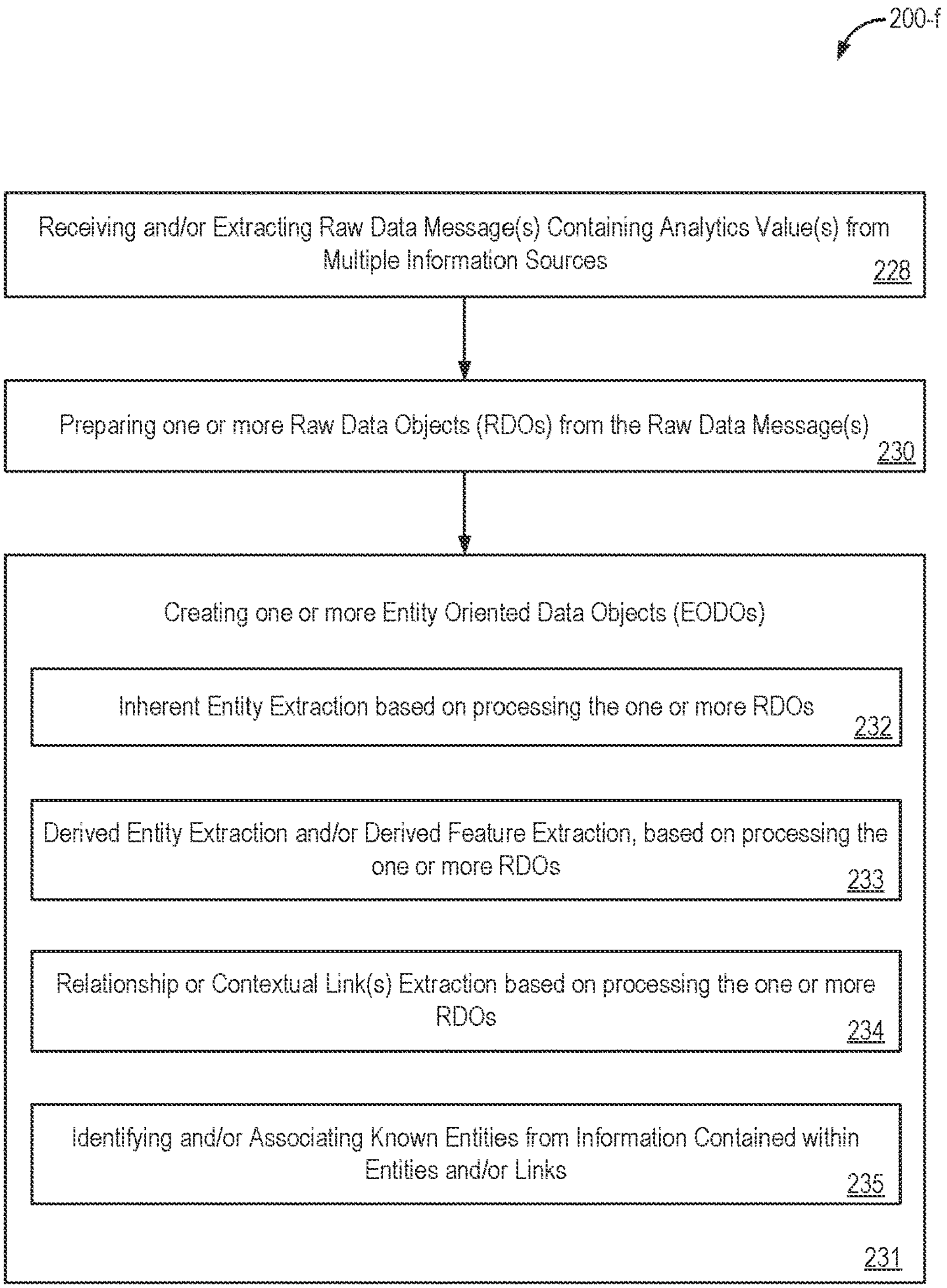

FIG. 2F

Storing information pertaining to at least the EODOs in a searchable data store that supports an Entity Aware Search Syntax (EASS), where the EASS enables data extraction using one or more of RDO properties, Entity Types, Entity Properties, Link Types, Entity-To-Entity Link Relationships, and/or Link Properties, and where searches using EASS are executed using one or more of command line, a Graphical User Interface (GUI), and programmatic actions or AI interactions 236

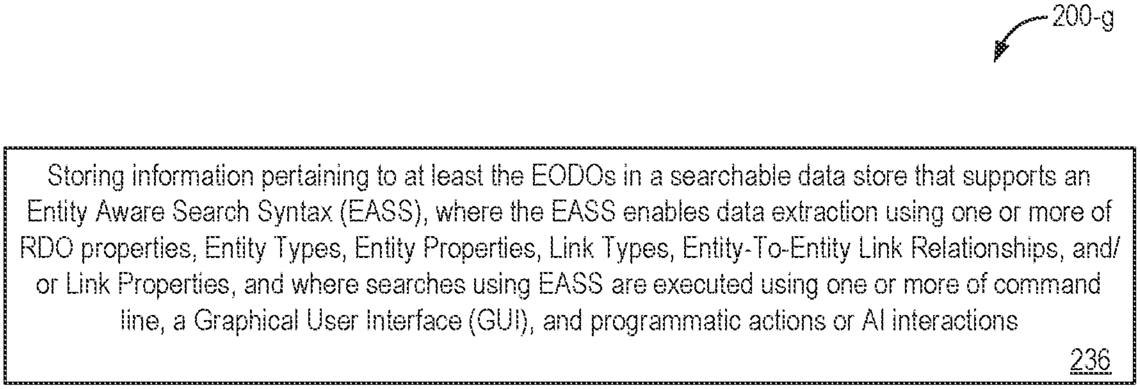

FIG. 2G

Extracting and/or Associating one or more of Entities and Links contained with one or more workflows, where each of the one or more workflows comprises one of a manual workflow or an automated workflow 238

↓

Enriching One or More Workflow Objects, based at least in part on Passing Information related to Entity Properties and/or Link Properties into the One or More Workflows 240

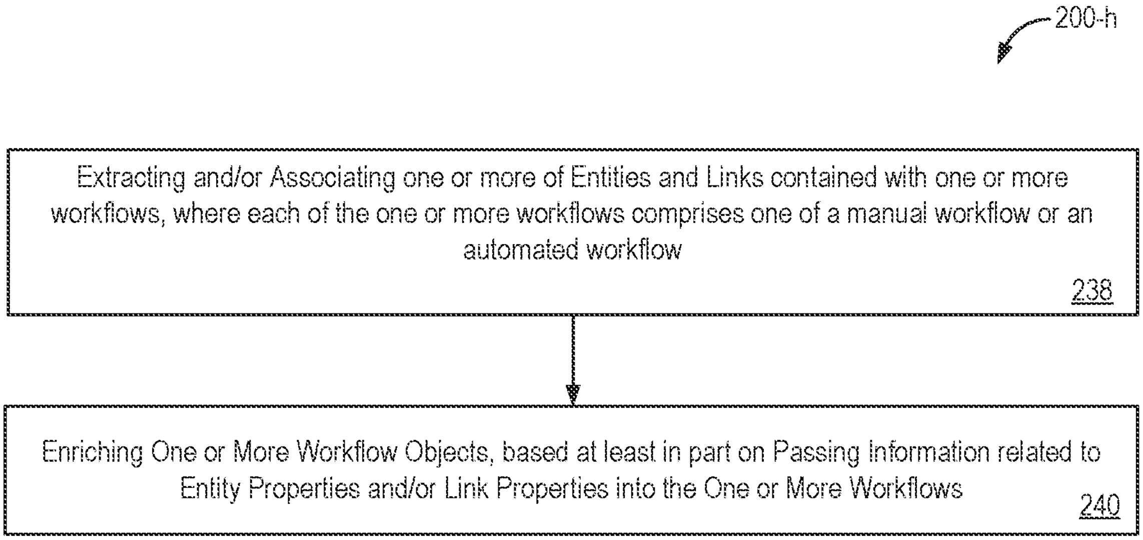

FIG. 2H

| Link | Link Examples | Query Language Examples |
|---|---|---|
| Attacked | [Machine 1] Attacked [Machine 2]<br><br>[Machine] Attacked [Service] | Machine.Name.Equals("attacker").Attacked.Machine<br><br>Machine.Attacked.Machine.Name.Equals("target")<br><br>Machine.Attacked.Machine. |
| Targeted | [Attack] Targeted [Machine]<br><br>[Attack] Targeted [Vulnerability] | Attack.MITRETechniqueID.Equals("2402").Targeted.Machine<br><br>Attack.Targeted.Machine.Name.Equals("target") |
| Detected | [Machine] Detected [Attack] | |
| Used | [Threat] Used [Attack]<br><br>[Machine] Used [Attack]<br><br>[Process] Used [Attack]<br><br>[Account] Used [Machine]<br><br>[Person] Used [Account] | |
| LoggedIn | [Account] LoggedIn [Machine] | |
| LoggedOut | [Account] LoggedOut [Machine] | |
| Read | [Account] Read [Object] | |

FIG. 6

| Link | Link Examples | Query Language Examples |
|---|---|---|
| IN | [Machine] IN [Location] | Machine.In.Location.Country.Equals("USA") |
| | [Person] IN [Location] | Person.Name.Equals("John Doe").In.Location |
| HAS | [Person] HAS [Account]<br>[Machine] HAS [Account]<br>[Machine] HAS [Vulnerability]<br>[Machine] HAS [File] | Machine.Has.Vulnerablity.CVE.Equals("53234")<br>Machine.IP.Equals("10.2.2.5").Has.Vulnerability |
| LACKS | [Machine] LACKS [Vulnerability] | |
| RUNNING | [Machine] RUNNING [Process]<br>[Machine] RUNNING [Service] | |
| Connected To | [Machine] Connected To [Service] | Machine.ConnectedTo.Machine.Name.Equals("attacker") |

FIG. 7

| Property | Type | Value Determination | Query Language Syntax |
|---|---|---|---|
| ID | Reference | Associated | DataStream.ID |
| Reporter | Reference | Associated (Not Persisted) | DataStream.Reporter |
| Zone | Reference | Associated (Not Persisted) | DataStream.Zone |
| DatasSourceType | Reference | Associated (Not Persisted) | DataStream.DataSourceType |
| Identifier | Reference | Associated (Not Persisted) | DataStream.Identifier |

*FIG. 8 (Processed Objects Data Stream Items)*

| Property | Type | Value Determination | QL Syntax |
|---|---|---|---|
| Datetime | Datetime | Derived | Event.Date |
| Count | Integer | Parsed | Event.Count |
| Duration | Float | Parsed | Event.Duration |
| Type | String | Parsed | Event.Type |
| ID | String | Parsed | Event.ID |
| Name | String | Parsed | Event.Name |
| Description | String | Parsed | Event.Description |
| Classification | Reference | Associated | Event.Classification |
| RDO | String | N/A | Event.RDO |

*FIG. 9 (Processed Objects Event Items)*

| Entity (Item) | Feature (Property) | Type | Value Determination | Linked Values Examples | QL |
|---|---|---|---|---|---|
| Threat | Name | String | Parsed | | Threat.Name |
| Threat | VendorID | String | Parsed | | Threat.VendorID |
| Attack | Name | String | Parsed | | Attack.Name |
| Attack | Description | String | Parsed | | Attack.Description |
| Attack | VendorID | String | Parsed | | Attack.VendorID |
| Attack | MitreAttackID | String | Parsed | | Attack.MitreAttackID |
| Attack | Type | Reference | Derived | • Remote<br>• Local<br>• BufferOverflow<br>• Race-Condition<br>• DOS-DDOS | Attack.Type |
| Attack | Risk | Reference | Derived | • Critical<br>• High<br>• Medium<br>• Low<br>• None | Attack.Risk |
| Attack | Severity | String | Parsed | | Attack.Severity |
| Vulnerability | CVE | String | Parsed | | Vuln.CVE |
| Vulnerability | Risk | Reference | Derived | • Critical<br>• High<br>• Medium<br>• Low<br>• None | Vuln.Risk |
| Vulnerability | Name | String | Parsed | | Vuln.Name |
| Vulnerability | Description | String | Parsed | | Vuln.Description |

*FIG. 10 (Cont...)*

| Entity (Item) | Feature (Property) | Type | Value Determination | Linked Values Examples | QL |
|---|---|---|---|---|---|
| Account | Type | Reference | Derived | • User<br>• System<br>• Email<br>• Unknown | Account.Type |
| Account | Domain | String | Parsed | | Account.Domain |
| Account | Username | String | Parsed | | Account.Username |
| Account | FullUsername | String | Parsed or Derived | | Account.FullUsername |
| Account | Role | String | Parsed | | Account.Role |
| Account | Privilege | String | Parsed | | Account.Privilege |
| Account | Account | Reference | Linked | • Added<br>• Deleted<br>• Disabled | [Entity].[Link].[Entity] |
| Account | Object | Reference | Linked | • Added<br>• Deleted<br>• Modified | [Entity].[Link].[Entity] |
| Group | Name | String | Parsed | | Group.Name |
| Group | Domain | String | Parsed | | Group.Domain |
| Secret | Type | Reference | Derived | • Password<br>• API-Key<br>• Certificate<br>• SSN<br>• Credit Card | Secret.Type |
| Secret | Value | String | Parsed | | Secret.Value |
| Object | Type | Reference | Derived | • File<br>• Table<br>• Record<br>• Registry | Object.Type |
| Object | Name | String | Parsed | | Object.Name |
| Object | Path | String | Parsed | | Object.Path |
| Object | Directory | String | Parsed | | Object.Directory |

*FIG. 10 (Cont…)*

| Entity (Item) | Feature (Property) | Type | Value Determination | Linked Values Examples | QL |
|---|---|---|---|---|---|
| Object | Extension | String | Parsed | | Object.Extension |
| Object | HashMD5 | String | Parsed | | Object.HashMD5 |
| Object | HashSHA1 | String | | | Object.HashSHA1 |
| Object | HashSHA2 | String | | | Object.HashSHA2 |
| Object | Key | String | Parsed | | Object.Key |
| Object | Value | String | Parsed | | Object.Value |
| Service | Name | String | Parsed | | Service.Name |
| Service | Port | Int | Parsed | | Service.Port |
| Service | Protocol | Reference | Linked | • Using | [Entity].[Link].[Entity] |
| Service | Process | Reference | Linked | • Using | [Entity].[Link].[Entity] |
| Protocol | Name | String | Parsed | | Protocol.Name |
| Protocol | IANANum | Int | Parsed | | Protocol.IANANum |
| Protocol | IANAKeyword | String | Parsed | | Protocol.IANAKeyword |
| Process | Name | String | Parsed | | Process.Name |
| Process | ProcessID | String | Parsed | | Process.ProcessID |
| Process | ParentName | String | Parsed | | Process.ParentName |
| Process | ParentProcessID | String | Parsed | | Process.ParentProcessID |
| Location | ZIP | Integer | Parsed | | Location.ZIP |
| Location | Longitude | Float | Parsed | | Location.Longitude |
| Location | Latitude | Float | Parsed | | Location.Latitude |
| Machine | Type | Reference | Derived | • Server<br>• Endpoint<br>• Tablet<br>• Phone | |
| Machine | IP | IP | Parsed or Derived | | Machine.IP |
| Machine | Name | String | Parsed or Derived | | Machine.Name |

*FIG. 10 (Cont…)*

| Entity (Item) | Feature (Property) | Type | Value Determination | Linked Values Examples | QL |
|---|---|---|---|---|---|
| Machine | FullName | String | Parsed or Derived | | Machine.FullName |
| Machine | Domain | String | Parsed or Derived | | Machine.Domain |
| Machine | MAC | String | Parsed | | Machine.MAC |
| Machine | Port | Int | Parsed | | Machine.Port |
| Machine | BytesIn | Int | Parsed | | Machine.BytesIn |
| Machine | BytesOut | Int | Parsed | | Machine.BytesOut |
| Machine | Service | Reference to a Service Entity | Linked | • Started<br>• Stopped<br>• Running | [Entity].[Link].[Entity] |
| Machine | Process | Reference | Linked | • Started<br>• Stopped<br>• Running | [Entity].[Link].[Entity] |
| Machine | Location | Reference | Linked | • In | [Entity].[Link].[Entity] |
| Machine | Object | Reference | Linked | • Sent<br>• Received<br>• Has | [Entity].[Link].[Entity] |
| Machine | Attack | Reference | Linked | • Used | [Entity].[Link].[Entity] |
| Machine | Vulnerability | Reference | Linked | • Has<br>• Lacks | [Entity].[Link].[Entity] |
| Person | FirstName | String | Parsed | | Person.FirstName |
| Person | MiddleName | String | Parsed | | Person.MiddleName |
| Person | LastName | String | Parsed | | Person.LastName |
| Person | FullName | String | Derived | | Person.FullName |
| Person | Phone | String | Parsed | | Person.Phone |
| Person | Account | Reference | Linked | • Has<br>• Used | [Entity].[Link].[Entity] |
| Person | Location | Reference | Linked | • In | [Entity].[Link].[Entity] |
| Person | Machine | Reference | Linked | • LoggedIn<br>• LoggedOut<br>• Used | [Entity].[Link].[Entity] |

*FIG. 10*

| Property | Type | Value Determination | QL Syntax |
|---|---|---|---|
| ID | Int | Reference | Observation.ID |
| Date | Date | Derived | Observation.Date |
| Rule | ObservationRule | Linked: TriggeredBy | Observation.Rule |
| FirstDate | Date | Derived (the first date of the associated EODOs) | Observation.FirstDate |
| LastDate | Date | Derived (the last date of the associated EODOs) | Ovservation.LastDate |

*FIG. 11*

| Property | Type | Value Determination | QL Syntax |
|---|---|---|---|
| ID | Int | Reference | Rule.ID |
| Name | String | Reference | Rule.Name |
| Description | String | Reference | Rule.Description |
| Author | String | Reference | Rule.Author |
| Reference | String | Reference | Rule.Reference |
| Severity | String | Reference | Rule.Severity |
| Type | Enumeration | Reference | Rule.Type |
| Criteria | Criteria | Reference | Rule.Criteria |

*FIG. 12*

| Property | Type | Value Determination | QL Syntax |
|---|---|---|---|
| Order | Int | Reference | |
| Filter | String | Reference | Criteria.Filter |
| Threshold | Int | Reference | |
| WindowType | Enumeration | none, etc. | |
| FirstDate | Date | | |
| LastDate | Date | | |

*FIG. 13*

SYSTEMS, METHODS, AND STORAGE MEDIA FOR CREATING AND MANAGING AN ENTITY-ORIENTED DATA FABRIC IN A PROTECTED ENVIRONMENT

FIELD OF THE DISCLOSURE

The present disclosure generally relates to a computing platform for managing and providing cybersecurity in a protected environment. More specifically, but without limitation, the present disclosure relates to systems, methods, and storage media for creating and managing an entity-oriented data fabric for a protected environment using a computing platform.

BACKGROUND

Businesses and government entities are increasingly in the crosshairs of cybercriminals and nation-state threats. Attacks and incidents are rising at an alarming rate. However, many businesses, especially small businesses or SMBs, struggle to move beyond basic information technology (IT) security due to cost and complexity. Furthermore, off-the-shelf firewalls and anti-virus are often inadequate when dealing with the sophisticated attacks by cybercriminals, especially those launched by nation-state adversaries with significant resources at their disposal. In some circumstances, threats such as ransomware, business email compromise, and financial fraud occur when attackers slip through porous defenses. While there are some ways to reduce the risk of such threats, e.g., by bolstering cyberthreat protection and defense mechanisms, such options are often beyond the budgets and/or technological capabilities of many businesses. To be truly secure, businesses and/or government entities, alike, need access to similar protection and defense-in-depth capabilities only larger enterprises can afford.

Thus, there is a need for a refined cybersecurity platform that can help reinforce cyberthreat protection and defense mechanisms for enterprises/businesses, while reducing the cost and/or complexity as compared to existing solutions.

The description provided in the background section should not be assumed to be prior art merely because it is mentioned in or associated with the background section. The background section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In ransomware and other incidents, some “entity” within the protected environment is typically compromised. That entity may be a user’s account, their laptop, a server, or another applicable device (e.g., a mobile device). As the threat expands, additional “things” or “entities” are compromised. To alleviate such issues, aspects of the present disclosure are broadly directed to techniques for creating and managing an entity-oriented data fabric in a protected environment, which can facilitate in enhancing entity driven analytics in a cybersecurity space, and thereby improve customer/client experience Specifically, but without limitation, aspects of the present disclosure are directed to creating and/or managing an entity-oriented data fabric (EODF) for a protected environment, where the EODF is created based on identifying a plurality of entities (e.g., person entity, user account entity, laptop entity, server entity, email address entity, attacker entity, to name a few non-limiting examples) associated with the protected environment, extracting contextualized features/properties from the raw data obtained from the plurality of entities, identifying links or relationships between different entities of the plurality of entities, and obtaining metadata information (e.g., author, date created, data modified, file size, description and/or keyword meta tags, to name a few) for at least a portion of the plurality of entities. In some implementations, the identified links or relationships help provide relational context between various, and oftentimes disparate, entities. Furthermore, in some implementations, obtaining metadata information for one or more of the plurality of entities may further include capturing metadata information pertaining to the contextual links or relationships.

In some aspects, the present disclosure enables creation of an EODF, where the EODF represents a protected environment and threats interacting with that protected environment. In some instances, the EODF is configured to reside within a computing platform (e.g., system 100, computing platform 102 in FIG. 1) and allow the computing platform to have an abstract, yet contextually accurate representation of the protected environment and threats engaging with, inside, and external to the protected environment.

In some aspects, this disclosure is also intended to provide consistent and dynamic application of contextualized data features (CDFs) to disparate sources of data via a uniform labeling model. This uniform labeling may help provide features and context about the underlying data object (also referred to as a raw data object or RDO), that is relatable to other data objects. In some implementations, RDOs from different data sources may be processed or transformed into processed objects or Entity Oriented Data Objects (EODOs), further described below with reference to FIG. 2F. As used herein, the terms “Entity Oriented Data Object”, “EODO”, and “processed object” may be used interchangeably throughout the disclosure. In some embodiments, the EODF comprises a plurality of EODOs, as well as the contextual links between EODOs.

In this way, aspects of the present disclosure can help provide a contextual metadata depiction of underlying data objects, that may form strong relationships with other data objects, which can help facilitate more accurate machine-based analytics, specifically in cross-device correlative analytics and the application of machine learning. In some implementations, aspects of the present disclosure may assist in enhancing the accuracy of machine-based analytic methods in support of advanced threat detection. In some implementations, aspects of the present disclosure may also assist in optimizing the cataloging of information related to cyber security incidents or actions that should be taken within the protected environment to reduce or minimize cyber incident risk. In some implementations, aspects of the present disclosure may also serve to enhance the precision and/or flexibility of automated responses delivered via programmatic actions initiated from a process able to comprehend the EODF to another system referenced by the EODF (e.g., the computing device or machine compromised by an Attack). In some instances, the other system referenced by the EODF may include one of a computing platform (e.g., remote computing platform 104 in FIG. 1), a server, a computing cluster comprising a plurality of computing nodes, a data center, a cloud server, a user device or user equipment (UE), a mobile computing device, or any other applicable computing device/machine. In addition to the above, aspects of the present disclosure may also facilitate in enhancing the precision of search-based analytics, which in turn may enable the system or platform to return the most applicable and/or focused datasets within a given security analytics scenario, e.g., in response to human-driven or programmatic search queries. In some instances, the system, such as system 100 in FIG. 1, of the present disclosure may also provide improved ability to find relationships and learnings across multiple Tenants in a SaaS platform delivery architecture, as compared to the prior art. Lastly, the system (e.g., system 100) of the present disclosure may also help improve the ability of current and/or future AI technologies in augmenting and automating capabilities in one or more of the aforementioned areas.

As used herein, the term "protected environment" may be used to refer to one or more of a cybersecurity environment, an internal computing network of an enterprise, Information Technology (IT) infrastructure used by an enterprise, external computing resources (e.g., cloud infrastructure provided by a 3$^{rd}$ party cloud services provider) utilized by the enterprise, supply chain and/or logistics infrastructure, and/or computing devices (e.g., smart phones, laptops, desktops, etc.) utilized by employees and/or contractors of an enterprise, to name a few non-limiting examples.

As used herein, the term "entity" may be used to refer to one or more of a person or user (e.g., John Doe), a user account (e.g., login information, user credential, service account, or any other applicable account utilized by one or more users), an end user system (e.g., a computing device, such as, but not limited to a laptop, a smartphone, a tablet computer, and a desktop), a server (e.g., a physical machine, a virtual machine), a service (e.g., Software as a Service (SaaS), a cloud service), Indicators of Compromise or IoC devices (e.g., human machine interface or HMI, control systems, etc.), and/or an Internet of Things or IoT device (e.g., a Wi-Fi enabled printer, a smart fridge, a smart thermostat, a voice and/or gesture controlled personal assistant device, a smart speaker, a smart TV, to name a few non-limiting examples). Some additional examples of entities may also include Vulnerabilities, Configuration Weaknesses pertaining to other systems/services within the protected environment, and Threat Actors leveraging or employing specific Attacks to target the protected environment.

One aspect of the present disclosure relates to a system configured for creating an entity-oriented data fabric in a protected environment. The system may include one or more hardware processors configured by machine-readable instructions, where the processor(s) may be configured to identify a plurality of entities associated with the protected environment; obtain first data from the protected environment, wherein the first data is associated with at least one entity of the plurality of entities; identify, for each of the plurality of entities, a relationship with at least one other entity of the plurality of entities, wherein the relationship is identified at least in part on the first data; create a plurality of objects, wherein each of the plurality of objects is associated with one or more entities of the plurality of entities and at least a portion of the first data; store first information related to the plurality of entities, the first data, each relationship with at least one other entity, and the plurality of objects; create the entity-oriented data fabric for the protected environment, based at least in part on storing the first information, wherein the entity-oriented data fabric includes a data framework for providing a unified view of at least the plurality of the entities and each relationship. In some implementations, creating the entity-oriented data fabric facilitates one or more of: discovering one or more compromised entities amongst the plurality of entities, identifying, from the plurality of entities, one or more entities whose likelihood of being compromised exceeds a predefined threshold, and preventing at least one of the plurality of entities from being compromised. In some implementations, the one or more hardware processor(s) may be further configured to provide at least a portion of the first information on a computing device, wherein the providing includes providing one or more of a visualization, a graph, and a table via a user interface (UI) on the computing device.

In some aspects, the techniques described herein relate to a system, wherein the plurality of entities includes: a first set of entities operating within, and with the protected environment; and a second set of entities that are external to the protected environment.

In some aspects, the techniques described herein relate to a system, wherein the first set of entities includes one or more entities selected from a group consisting of a user, an email inbox, a user account, a computing device, a server, a virtual machine, and an Internet of Things (IoT) device.

In some aspects, the techniques described herein relate to a system, wherein the second set of entities includes one or more entities selected from a group consisting of: a cloud service infrastructure associated with at least one cloud service provider, an Information Technology (IT) infrastructure associated with at least one customer, and a supply chain IT infrastructure associated with the at least one customer.

In some aspects, the techniques described herein relate to a system, wherein the second set of entities includes at least one entity including one of a malicious entity and an attacker entity, wherein the at least one of a malicious entity and an attacker entity is selected from a group consisting of: at least one malicious hacker, a computing device associated with the at least one malicious hacker, cloud service infrastructure utilized by the at least one malicious hacker, one or more known threat actors, a malware program, a software program, a program or code to exploit a software vulnerability or security flaw, a nation-state adversary, and one or more known security vulnerabilities.

In some aspects, the techniques described herein relate to a method for creating an entity-oriented data fabric in a protected environment, the method including: identifying a plurality of entities associated with the protected environment; obtaining first data from the protected environment, wherein the first data is associated with at least one entity of the plurality of entities; identifying, for each of the plurality of entities, a relationship with at least one other entity of the plurality of entities, wherein the relationship is identified at least in part on the first data; creating a plurality of objects, wherein each of the plurality of objects is associated with one or more entities of the plurality of entities and at least a portion of the first data; storing first information related to the plurality of entities, the first data, each relationship with at least one other entity, and the plurality of objects; creating the entity-oriented data fabric for the protected environment, based at least in part on storing the first information, wherein the entity-oriented data fabric includes a data framework for providing a unified view of at least the plurality of the entities and each relationship, and wherein creating the entity-oriented data fabric facilitates one or more of: discovering one or more compromised entities amongst the plurality of entities, identifying, from the plurality of entities, one or more entities whose likelihood of being compromised exceeds a pre-defined threshold, and preventing at least one of the plurality of entities from being compromised. In some implementations, the method further includes providing at least a portion of the first information on a computing device, wherein the providing includes providing one or more of a visualization, a graph, and a table via a user interface (UI) on the computing device.

In some aspects, the techniques described herein relate to a method, wherein the plurality of entities includes: a first set of entities operating within, and with the protected environment; and a second set of entities that are external to the protected environment.

In some aspects, the techniques described herein relate to a method, wherein the first set of entities includes one or more entities selected from a group consisting of: a user, an email inbox, a user account, a computing device, a server, a virtual machine, and an Internet of Things (IoT) device.

In some aspects, the techniques described herein relate to a method, wherein the second set of entities includes one or more entities selected from a group consisting of: a cloud service infrastructure associated with at least one cloud service provider, an Information Technology (IT) infrastructure associated with at least one customer, and a supply chain IT infrastructure associated with the at least one customer.

In some aspects, the techniques described herein relate to a method, wherein the second set of entities includes at least one entity including one of a malicious entity and an attacker entity, wherein the at least one of a malicious entity and an attacker entity is selected from a group consisting of: at least one malicious hacker, a computing device associated with the at least one malicious hacker, cloud service infrastructure utilized by the at least one malicious hacker, one or more known threat actors, a malware program, a software program, a program or code to exploit a software vulnerability or security flaw, a nation-state adversary, and one or more known security vulnerabilities.

In some aspects, the techniques described herein relate to a method, wherein: obtaining the first data from the protected environment includes extracting one or more contextualized features from the first data; and extracting the contextualized features includes one or more of: inherent feature extraction, the inherent feature extraction includes extracting second information related to at least one of an Internet Protocol (IP) address, a Media Access Control (MAC) address, a username, a unique identifier for a user, a phone number, and a domain name, and derived feature extraction, the derived feature extraction includes extracting second data related to, but not included in, the first data, the second data being different from the second information.

In some aspects, the techniques described herein relate to a method, wherein creating a plurality of objects is based at least in part on obtaining the first data from the protected environment. In some implementations, each of the plurality of objects includes at least a portion of the first data, and one or more of the extracted contextualized features.

In some aspects, the techniques described herein relate to a method, wherein, the first information and the plurality of objects reside within a searchable data store; and the searchable data store further includes third information related to at least one of: one or more vulnerability reports, one or more threat intelligence reports, a respective attribute of one or more of the plurality of objects, and a respective contextualized attribute of one or more of the plurality of objects.

In some aspects, the techniques described herein relate to a method, further including receiving a request for retrieving, from the searchable data store, fourth information, wherein the fourth information includes information related to one or more of a first entity, a first object, a first vulnerability report, a first threat intelligence report, an attribute of the first object, and a contextualized attribute of the first object.

In some aspects, the techniques described herein relate to a method, wherein, the relationship is further identified, at least in part, by: determining at least one of one or more strong keys and one or more weak keys for at least a portion of the plurality of entities; each of the one or more strong keys is static for a longer duration than each of the one or more weak keys; and each of the one or more strong keys exhibits a higher level of cardinality than each of the one or more weak keys.

In some aspects, the techniques described herein relate to a method, wherein the plurality of entities includes one or more known entities and one or more synthetic entities, and further including: identifying, for at least one of the one or more synthetic entities, a relationship with at least one of the one or more known entities; and identifying one or more additional links or relationships for one or more of the plurality of entities, based on assessing fifth information, wherein the fifth information includes information related to the one or more strong keys and the one or more weak keys.

In some aspects, the techniques described herein relate to a method, further including obtaining metadata information for at least a portion of the plurality of entities, and wherein creating the entity-oriented data fabric (EODF) is based at least in part on obtaining the metadata information.

In some aspects, the techniques described herein relate to a method, wherein, a compromised entity includes an entity that has been jeopardized or attacked during an event, the compromised entity is selected from a group consisting of a user, an email address, a computing device, a software program, a user account, and a server, and the event includes one or more of clicking on a phishing link, visiting a malicious website, installing malware on the computing device or server, installing ransomware on the computing device or server, a hacking of the email address, and a hacking of the user account.

In some aspects, the techniques described herein relate to a non-transient computer-readable storage medium having instructions embodied thereon, the instructions being executable by one or more processors to perform a method for creating an entity-oriented data fabric in a protected environment, the method including: identifying a plurality of entities associated with the protected environment; obtaining first data from the protected environment, wherein the first data is associated with at least one entity of the plurality of entities; identifying, for each of the plurality of entities, a relationship with at least one other entity of the plurality of entities, wherein the relationship is identified at least in part on the first data; creating a plurality of objects, wherein each of the plurality of objects is associated with one or more entities of the plurality of entities and at least a portion of the first data; storing first information related to the plurality of entities, the first data, each relationship with at least one other entity, and the plurality of objects; creating the entity-oriented data fabric for the protected environment, based at least in part on storing the first information, wherein the entity-oriented data fabric includes a data framework for providing a unified view of at least the plurality of the entities and each relationship, and wherein creating the entity-oriented data fabric facilitates one or more of: discovering one or more compromised entities amongst the plurality of entities, identifying, from the plurality of entities, one or more entities whose likelihood of being compromised exceeds a pre-defined threshold, and preventing at least one of the plurality of entities from being compromised. In some implementations, the method further includes providing at least a portion of the first information on a computing device, wherein the providing includes providing one or more of a visualization, a graph, and a table via a user interface (UI) on the computing device.

In some aspects, the techniques described herein relate to a non-transient computer-readable storage medium, wherein the plurality of entities includes: a first set of entities operating within with the protected environment; and a second set of entities that are external to the protected environment.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of ‘a’, ‘an’, and ‘the’ include plural referents unless the context clearly dictates otherwise.

BRIEF DESCRIPTION OF THE DRAWINGS

FIG. 2A illustrates a first method for creating an EODF in a protected environment, in accordance with various aspects of the disclosure.

FIG. 2F illustrates an example of a method for creating Entity-Oriented Data Objects (EODOs) for an EODF, in accordance with various aspects of the disclosure.

FIG. 2G illustrates an example of a method for storing EODO related information in a searchable data store, in accordance with various aspects of the disclosure.

FIG. 2H illustrates an example of a method for enriching workflow objects in an EODF, in accordance with various aspects of the disclosure.

FIG. 6 illustrates examples of various links and query language structure that can be used to search for one or more entities having a particular link to one or more other entities, in accordance with various aspects of the disclosure.

FIG. 7 illustrates examples of various links and query language structure that can be used to search for one or more entities having a particular link to one or more other entities, in accordance with various aspects of the disclosure.

FIG. 8 illustrates examples of processed object data stream items, including their properties, value types, value determination, and query language (QL) syntax, in accordance with various aspects of the disclosure.

FIG. 9 illustrates examples of processed objects event items, including their properties, value types, value determination, and QL syntax, in accordance with various aspects of the disclosure.

FIG. 10 (shown over multiple pages) illustrates examples of entities/items, their properties, value types, value determination, linked values (if applicable), and QL syntax, according to various aspects of the disclosure.

FIG. 11 illustrates examples of properties, types, value determination, and QL syntax for processed object observation items, in accordance with various aspects of the disclosure.

FIG. 12 illustrates examples of properties, types, value determination, and QL syntax for processed object observation rule items, in accordance with various aspects of the disclosure.

FIG. 13 illustrates examples of properties, types, value determination, and QL syntax for processed object observation rule criteria, in accordance with various aspects of the disclosure.

DETAILED DESCRIPTION

Figure 1:
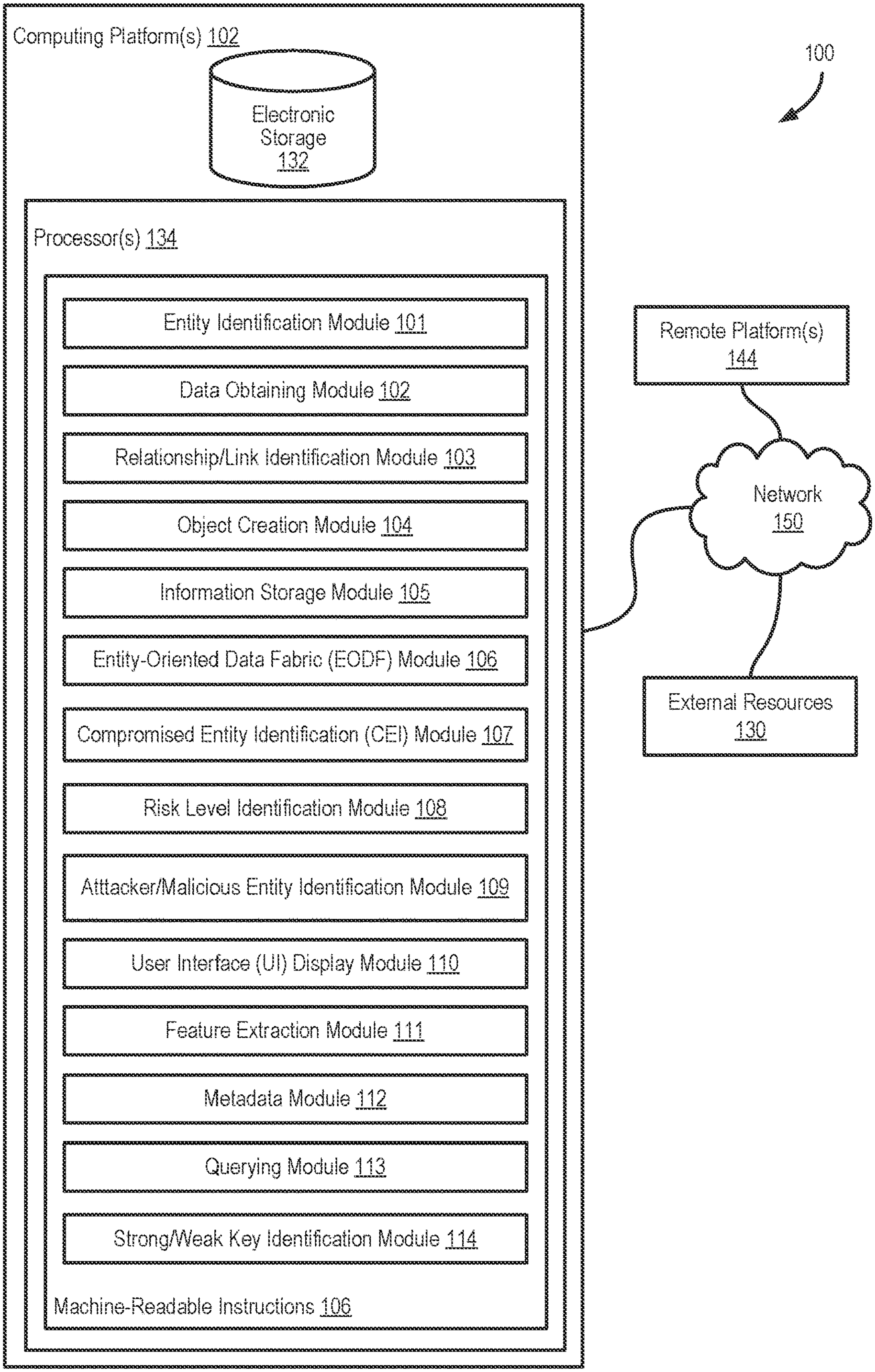
FIG. 1 illustrates a system configured for creating an entity-oriented data fabric (EODF) in a protected environment using a computing platform, in accordance with various aspects of the disclosure.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device", "computing device", mobile device", "IoT device", is not meant to be limiting to a single such device. It is contemplated that numerous devices may comprise a single "device" as described herein.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. However, it should be understood that these terms are employed to provide a clear description of an embodiment of the present disclosure, and no such human operator is necessary.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases, the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather than a result of an instruction.

Some embodiments of the present disclosure rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

As used herein the term "data fabric" refers to a digital and/or computing device framework and network-based architecture (vs point-to-point connections) architecture for delivering large, consistent, integrated data, often from a centralized technology infrastructure, e.g., using a hybrid cloud. In some cases, a data fabric may comprise an architecture and set of data services that are designed to provide consistent capabilities across a plurality of computing devices, endpoints, computing nodes, etc., spanning hybrid multi-cloud environments. Such a design enables an integrated data layer (or fabric) to be provided between multiple data sources to support data analytics, insight generation, orchestration, and applications.

Broadly, aspects of the present disclosure are directed to creating and/or managing an entity-oriented data fabric (EODF) in a protected environment, where the EODF is created based on identifying a plurality of entities (e.g., person entity, user account entity, laptop entity, server entity, email address entity, attacker entity, to name a few non-limiting examples) associated with the protected environment, extracting contextualized features/properties (e.g., an IP address, a MAC address, a username, a unique identifier for a user, a phone number, a domain name (e.g., radicl.io), geolocation data, classification data, and/or known entities data, to name a few non-limiting examples) from the raw data obtained from the plurality of entities, identifying links or relationships between different entities of the plurality of entities, and obtaining metadata information for at least a portion of the plurality of entities. In some aspects, the EODF described herein can help "stitch together" or provide an abstract representation of a protected environment (PE), which may include information related to not only the numerous entities (i.e., entities associated with the system/platform, entities associated with the client or customer, malicious or attacker entities, $3^{rd}$ party entities, such as those associated with a cloud service provide) engaging or interacting with the protected environment, but also the contextual information pertaining to said entities. In some regards, the EODF may serve as a uniform security analytics foundation that higher level functions can leverage and be built open.

Furthermore, in accordance with various aspects of the disclosure, the systems 100 and/or 300 allow the creation of an EODF, where the EODF represents a protected environment and threats interacting with that protected environment. In some aspects, the EODF resides outside the protected environment. Specifically, but without limitation, the EODF resides within a computing platform and allows the computing platform to have an abstract, yet contextually accurate representation of the protected environment and threats engaging with, inside and external to the protected environment.

As used herein, the term "protected environment" may be used to refer to one or more of a cybersecurity environment, an internal computing network of an enterprise, Information Technology (IT) infrastructure used by an enterprise, external computing resources (e.g., cloud infrastructure provided by a $3^{rd}$ party cloud services provider) utilized by the enterprise, supply chain and/or logistics infrastructure, and/or computing devices (e.g., smart phones, laptops, desktops, etc.) utilized by employees and/or contractors of an enterprise, to name a few non-limiting examples. However, it should be noted that other types of protected environments besides the ones listed herein are contemplated in different embodiments.

In some implementations, aspects of the present disclosure may assist in enhancing the accuracy of machine-based analytic methods in support of advanced threat detection. In some implementations, aspects of the present disclosure may also assist in optimizing the cataloging of information related to cyber security incidents or actions that should be taken within the protected environment to reduce or minimize cyber incident risk. In some implementations, aspects of the present disclosure may also serve to enhance the precision and/or flexibility of automated responses delivered via programmatic actions initiated from a process able to comprehend the EODF to another system referenced by the EODF (e.g., the computing device or machine compromised by an Attack). In some instances, the other system referenced by the EODF may include one of a computing platform (e.g., remote platform 144 in FIG. 1), a server, a computing cluster comprising a plurality of computing nodes, a data center, a cloud server, a user device or user equipment (UE), a mobile computing device, or any other applicable computing device/machine. In addition to the above, aspects of the present disclosure may also facilitate in enhancing the precision of search-based analytics, which in turn may enable the system (e.g., system 100) or platform (e.g., computing platform 102) to return the most applicable and/or focused datasets within a given security analytics scenario, e.g., in response to human-driven or programmatic search queries. In some instances, the system, such as system 100, of the present disclosure may also provide improved ability to find relationships and learnings across multiple Tenants in a SaaS platform delivery architecture, as compared to the prior art. Lastly, the system (e.g., system 100) of the present disclosure may also help improve the ability of current and/or future AI technologies in augmenting and automating capabilities in one or more of the aforementioned areas.

To achieve one or more of the above outcomes, the disclosed system and/or the EODF may be configured to extract entities from various sources of data and create contextual links between entities, as further described below with reference to FIGS. 3A through 4B. In some instances, a contextual link serves to describe the relationship between an entity and one or more other entities as "useful" or "appropriate" to the various applications, use cases, potential benefits, etc., described above. In some embodiments, the data obtained from the various data sources may include (1) Actions and Activity occurring within the protected environment (PE), (2) Actions and Activity occurring outside the PE, (3) Information on the state of Entities within the PE (e.g., known Vulnerabilities), (4) Information on the state of Entities outside the PE (e.g., threat actor IT infrastructure), and/or (5) reference information relevant to security analytics and incident response (e.g., publicly available Vulnerability databases, MITRE ATT&CK database, etc.). It should be noted that other types of data besides those described above in (1)-(5) are contemplated in different embodiments, and the example data discussed herein is not intended to limit the scope and/or spirit of the present disclosure.

In some aspects, the EODF disclosed herein can be seen as being "data driven", which allows the types of entities, relationships or links, etc., to not only be dynamically updated/constantly evolved in response to an ever-adapting IT word, but also to be tailored to unique analytics/PE scenarios.

In some aspects, this disclosure is also intended to provide consistent and dynamic application of contextualized data features (CDFs) to disparate sources of data via a uniform labeling model. This uniform labeling may help provide features and context about the underlying data object (i.e., raw data objects or RDOs) and may further help to show how the features, context and underlying data object (e.g., RDO) is relatable to other data objects (e.g., other RDOs; other processed objects, also referred to as entity-oriented data objects or EODOs). In this way, aspects of the present disclosure can help provide a contextual metadata depiction of underlying data objects, how these underlying data objects form strong relationships with other data objects, and how this depiction and these relationships help facilitate more accurate machine-based analytics, with one such example comprising cross-device correlative analytics and the application of machine learning.

Some non-limiting examples of entities along with their associated properties/features (written in the form Entity/Feature) may include: (1) Threat/Name, (2) Threat/VendorID, (3) Attack/Name, (4) Attack/Description, (5) Attack/VendorID, (6) Attack/Type, (7) Attack/Risk, (8) Attack/Severity, (9) Vulnerability/CVE, (10) Vulnerability/Risk, (11) Vulnerability/Name, (12) Vulnerability/Description, (13) Account/Type, (14) Account/Domain, (15) Account/Username, (16) Account/FullUserName, (17) Account/Role, (18) Account/Privilege, (19) Group/Name, (20) Group/Domain, (21) Secret/Type, (22) Secret/Value, (23) Object/Type, (24) Object/Name, (25) Object/Path, (26) Object/Directory, (27) Object/Value, (28) Object/Hash, (29) Service/Name, (30) Service/Protocol, (31) Service/Process, (32) Protocol/Name, (33) Process/Name, (34) Process/ProcessID, (35) Process/ParentName, (36) Location/Zip, (37) Location/Longitude, and (38) Location/Longitude.

Some other types of entities and their associated properties/features may further include: (39) Machine/Type, (40) Machine/IP, (41) Machine/Name, (42) Machine/FullName, (43) Machine/Domain, (44) Machine/MAC, (45) Machine/Service, (46) Machine/Process, (47) Machine/Location, (48) Machine/Attack, and/or (49) Machine/Vulnerability.

Some other types of entities and their associated properties/features may further include: (50) Person/FirstName, (51) Person/MiddleName, (52) Person/LastName, (53) Person/FullName, (54) Person/Phone, (55) Person/Account, (56) Person/Location, (57) Person/Machine, (58) Machine/Location, (59) Machine/Attack, and/or (60) Machine/Vulnerability.

In some cases, each of the entity-feature pairs may be associated with a value type (e.g., string, reference, integer, floating point number, to name a few non-limiting examples). Furthermore, the value for each entity-feature pair may be one of parsed, derived, parsed or derived, and linked. As an example, the value type and determination for the (49) Machine/Vulnerability pair may be referenced and linked, respectively. As another example, the value type and determination for (1) Threat/Name pair may be string and parsed, respectively. In yet another example, the value type and determination for the (36) Location/Zip pair may be integer and parsed, respectively.

Some non-limiting examples of derived/linked values may include Critical, High, Medium, Low, None, for instance, for a risk or severity of an attack or vulnerability. In another example, the derived values for the Account/Type pair may include user, system, email, or unknown. In some examples, the linked value for a Service/Protocol or Service/Process may be 'Using'. In some cases, the linked value for the Machine/Vulnerability pair may include 'Has' or 'Lacks'.

It should be noted that the entities and their associated features/properties, value types, derived/link values (where applicable) described herein are exemplary only and not intended to limit the scope and/or spirit of the disclosure. Additionally, it should be noted that other types of entities besides the ones listed herein are contemplated in different embodiments.

Some aspects of the disclosure enable the creation of an EODF (e.g., EODF 302 in FIG. 3) that represents a protected environment (PE), such as PE 337, and threats interacting with that PE. In some aspects, the EODF resides outside the PE. In some embodiments, the EODF resides within a computing platform and allows the computing platform to have an abstract, yet contextually accurate representation of the PE and threats/risks about the PE, where the threats or risks may reside inside the PE, may reside external to the PE, or both.

Some of the potential use cases and/or improvements provided by the disclosure may serve to (1) improve the accuracy of machine-based analytic methods in support of advanced threat detection, (2) improve the cataloging of information related to cyber security incidents or actions that should be taken within the environment to decrease cyber incident risk, (3) improve the precision and flexibility of automated responses delivered via programmatic actions initiated from a process able to comprehend the EODF to another system referenced by the EODF (e.g., the computing machine or device compromised by the Attack), (4) improve the precision of search-based analytics, enabling human-driven or programmatic queries to return the most applicable and focused dataset within a given security analytics scenario, (5) improve the ability to find relationships and learnings across Tenants in a SaaS platform delivery architecture, and/or (6) improve the ability of current and future "AI" technologies to augment and automate capabilities in all aforementioned areas. To achieve these outcomes, the EODF must be able to extract entities from various sources of data (e.g., shown as local PE Infrastructure 381, remote PE infrastructure, cloud PE infrastructure 383, cloud/SaaS services 384, reference data repositories 385 in FIG. 3C) and create contextual links between the entities describing their relationship to each other as useful and appropriate to the applications described above. This data may include actions and activity occurring within the PE, actions and activity occurring outside the PE (e.g. via threat actors), Information on the state of Entities within the PE (e.g., known vulnerabilities), information on the state of entities outside the PE (e.g., threat actor IT infrastructure), reference information relevant to security analytics and incident response (e.g., publicly available vulnerability databases, MITRE ATT&CK database, etc.). The EODF is "data driven" allowing for types of entities and links to be constantly evolved based on an ever adapting IT technology world, and to be tailored to unique analytics/PE scenarios.

As used herein, the term "fabric" is intended to convey the idea that the system of the present disclosure enables stitching together an abstract representation of the PE and other entities engaging with the PE, as well as contextual information about the PE and the various entities interacting with and/or associated with the PE. In some aspects, this fabric (i.e., EODF) serves as a uniform security analytics foundation that higher level functions can leverage and be built open.

In some instances, the EODF may be created/leveraged using an EODF processing process, which may entail (1) Raw Data Extraction and Receipt, where raw data "messages" containing analytics values are extracted and/or received from information sources (e.g., file based, API based, query based, network transmission/stream based, etc.); (2) Raw Data preparation, where each discrete raw data message is prepared for EODF processing as a raw data object or RDO. Each RDO may carry with it the original source of the data, the timestamp of the data normalized to an absolute time standard (e.g., UTC), and may be assigned to one or more data streams that carry additional contextual information about the type of data contained in the RDO (e.g., data type, information sub-system, error severities, etc.); and (3) Creating an Entity Enriched Data Object (EEDO).

In some instances, creating the EEDO may include Inherent Entity Extraction, where Inherent Entity Extraction includes processing RDOs and Entities of various types, populating entities with properties/features, where the value of each property/feature exists in at least one RDO.

In some instances, creating the EEDO may further include Derived/Inferred Entity Extraction and/or Derived Feature Extraction, where the information contained in the RDO may used to infer and derive additional entities and/or add properties/features to entities.

In some instances, creating the EEDO may further include Relationship Extraction, where information contained in the RDO, or inferred/derived from the RDO is used to create contextual links between Entities. In some cases, links describe a relationship that exists between two entities. Links can also carry additional properties/features that provide further information on the relationship, for instance: amount of data transferred between two entities; amount of time one entity interacted with another entity, and error conditions occurring within an interaction between two entities.

Some aspects of the present disclosure can comprise known entity association, where information contained within entities and links is used to identify and associate a pre-existing, cataloged, "Known Entity" with the entity constructed at run time (i.e., Synthetic Entity). The Known Entity contains additional information about the real-world Entity (e.g., the actual Machine, Person, etc.) that may not be available in some instances.

In some embodiments, the EEDO can be persisted to an information store (e.g., a searchable data store, such as data store 323 in FIG. 3) in a manner that allows it to be searched via an Entity Aware Search Syntax (EASS) (e.g., Query Language). In some cases, EEDO's can be searched via an EASS, where the EASS allows for precise data extraction based on any combination of RDO properties (e.g., Datasource, timestamp, stream, etc.) Entity Types, Entity Properties, Link Types, Entity-To-Entity Link Relationships, and Link Properties. In some cases, such searches may be executed via a command line (human interaction), a GUI (human interaction), or programmatic actions (AI interaction).

In some instances, within various workflows (whether manual or automated), entities and links contained within EEDOs can be extracted and associated. This provides a uniform way of enriching workflow objects. Furthermore, properties of entities/links can be passed into workflows to tailor the workflow to a more specific outcome. Some non-limiting examples of such automated workflows include: automatically disabling an account for "Person.Login", or automatically quarantining a host for "Machine.IPAddress", or automatically deleting an email for "Person.EmailAddress" and "Email.Subject", or a combination thereof.

In some cases, "mappings" are created, where the mappings describe and determine the entities/links to extract. In some cases, mappings may be human-defined. In some embodiments of the disclosure, AI techniques may be utilized to optimize such human-defined mappings, as compared to the prior art. For example, in some cases, additional EODF processing techniques may include employing AI technology for (1) suggesting new/improved mappings based on observing human-build mappings against data being processed, and feedback on the accuracy of this processing, (2) automatically creating and continuously evolving mappings based on access to a larger set of data, across more disparate environments, with a larger learning set, and human feedback around the accuracy of AI generated mappings over time. In some embodiments, AI models can be trained such that new sources of RDO's can be automatically converted into EEDOs and incorporated into the EODF with minimal to no human effort.

Some embodiments of the present disclosure may support searching via an entity oriented search syntax (EASS), that can leverage entity types, feature types, feature values of synthetic entities, feature values of known entities. Some embodiments of the present disclosure may also allow a user to search by link types, link feature types, and/or link feature values of synthetic entity links.

Some embodiments of the present disclosure may further support one or more of synthesizing entities and their properties, creating links between entities and assigning properties to the links. In some aspects, the properties of the entities that describe a distinct entity help enable analytics/automation, in accordance with one or more implementations of the disclosure.

As described in further detail below, the EODF comprises a data framework for providing a unified view of at least the plurality of entities and each relationship, where creating the EODF facilitates one or more of (1) discovering one or more compromised entities amongst the plurality of entities, (2) identifying one or more threats in the PE, (3) identifying one or more weaknesses in the PE, (4) workflow execution, based at least in part on passing the plurality of entities into automated workflows, (5) cataloging one or more entities of interest related to manual workflows, (6) identifying, from the plurality of entities, one or more entities whose likelihood of being compromised exceeds a pre-defined threshold, and (7) preventing at least one of the plurality of entities from being compromised.

In some embodiments, the system may be configured to extract information from reference databases (e.g., national vulnerability database, MITRE ATT&CK, etc.). In some embodiments, the system may be configured to extract information related to Information Technology (IT) infrastructure, Operational Technology (OT) infrastructure, and Cloud infrastructure. In some embodiments, the system may be configured to extract information related to IT environment vulnerabilities, OT environment vulnerabilities, and/or Cloud environment vulnerabilities. In some embodiments, the system may be configured to extract information related to configuration weaknesses.

In some embodiments, the extracted features may pertain to the entities, the links or relationships, or both. In some embodiments, the inherent feature extraction may further comprise extracting information related to one or more of an IP address, a MAC address, a username, a unique identifier for a user, a phone number, a vulnerability identifier (e.g., CVE ID), attack identifier (e.g., MITRE ATT&CK ID), a threat identifier (e.g., threat codename), and/or cloud infrastructure properties (e.g., container ID, service name).

As noted above, some embodiments of the disclosure support application of Artificial Intelligence (AI) and/or Machine Learning (ML) techniques, where ML/AI is able to automatically construct or augment the construction of the EODF.

FIG. 1 illustrates a system 100 configured for creating and managing an entity-oriented data fabric (EODF) in a protected environment using a computing platform, according to various aspects of the present disclosure. In some implementations, system 100 may include one or more computing platform(s) 102. Computing platform(s) 102 may be configured to communicate with one or more remote platforms 144 according to a client/server architecture, a peer-to-peer architecture, and/or other architectures. In some cases, the computing platform 102 may implement one or more aspects of the system 300-*a* below in relation to FIG. 3A. Remote platform(s) 144 may be configured to communicate with other remote platforms via computing platform(s) 102 and/or according to a client/server architecture, a peer-to-peer architecture, and/or other architectures. In some embodiments, users may access system 100 via remote platform(s) 144. In some examples, the terms "remote computing platform", "remote platform", "user device", and "user equipment" may be used interchangeably throughout the disclosure. Some non-limiting examples of remote platform(s) include laptops, desktop computers, smartphones, and/or tablets. In some cases, the remote computing platform 144 may be similar or substantially similar to one or more of the entities (e.g., client entities 305-*a* through 305-*c*, external entities 305-*d* through 305-*f*) described below in reference to FIG. 3A.

Computing platform(s) 102 may be configured by machine-readable instructions 106. Machine-readable instructions 106 may include one or more instruction modules. The instruction modules may include computer program modules. The instruction modules may include one or more of entity identification module 101, data obtaining module 102, relationship/link identification module 103, object creation module 104, information storage module 105, entity-oriented data fabric (EODF) module 106, compromised entity identification (CEI) module 107, risk level identification module 108, attacker/malicious entity identification module 109, user interface (UI) display module 110, feature extraction module 111, metadata module 112, querying module 113, strong/weak key identification module 114, and/or other instruction modules. It should be noted that one or more of the instruction modules described herein may be optional. Alternatively, in some embodiments, a single instruction module may be utilized to effectuate the functions of a plurality of instruction modules.

Figure 3A:
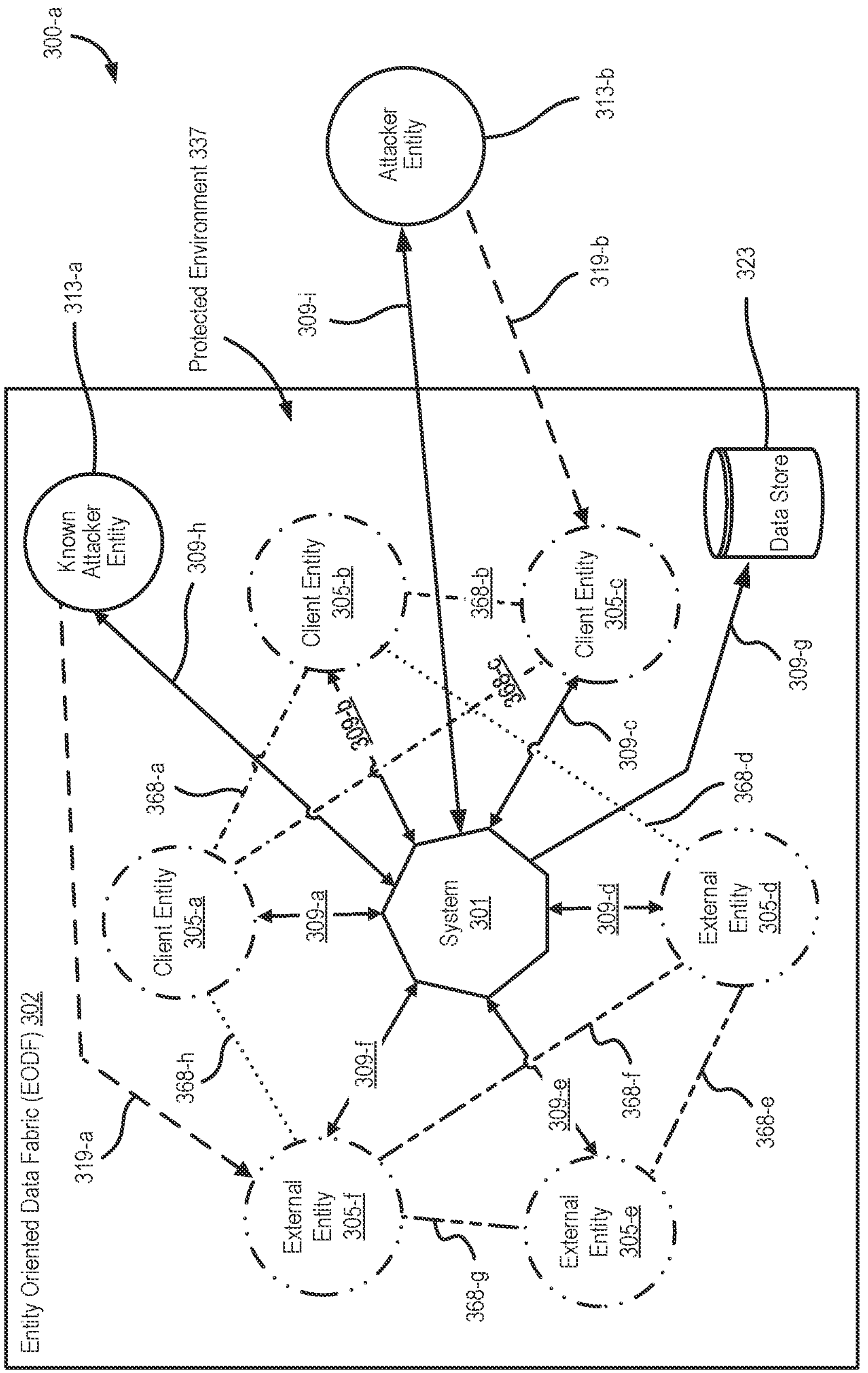
FIG. 3A illustrates a block diagram of an EODF that can be created using the system shown in FIG. 1, where the EODF includes a plurality of entities and a plurality of links or relationships between the plurality of entities, in accordance with various aspects of the disclosure.

Entity identification module 101 may be configured to identify a plurality of entities associated with a protected environment. FIG. 3A illustrates a plurality of entities, including one or more client entities (e.g., client entities 305-*a*, 305-*b*, 305-*c*) and one or more external entities (e.g., external entities 305-*d*, 305-*e*, 305-*f*). FIG. 3A also illustrates a plurality of attacker or malicious entities 313-*a* and 313-*b*.

In some embodiments, the plurality of entities comprises a first set of entities operating within with the protected environment and a second set of entities that are external to the protected environment. For instance, with reference to FIG. 3A, the first set of entities may include the client entities 305-*a* through 305-*c*, and the second set of entities may comprise the external entities 305-*d* through 305-*f*. In some embodiments, the first set of entities includes one or more entities selected from a group consisting of a user, an email inbox, a user account, a computing device, a server, a virtual machine, and an Internet of Things (IoT) device. In some embodiments, the second set of entities includes one or more entities selected from a group consisting of a cloud service infrastructure associated with at least one cloud service provider, an Information Technology (IT) infrastructure associated with at least one customer, and a supply chain IT infrastructure associated with the at least one customer. Additionally, or alternatively, the second set of entities includes at least one entity comprising one of a malicious entity and an attacker entity, wherein the at least one of a malicious entity and an attacker entity is selected from a group consisting of at least one malicious hacker, a computing device associated with the at least one malicious hacker, cloud service infrastructure utilized by the at least one malicious hacker, one or more known threat actors, a malware program, a software program, a program or code to exploit a software vulnerability or security flaw, a nation-state adversary, and one or more known security vulnerabilities. Other types of entities besides the ones described above are contemplated in different embodiments, and the examples listed herein are not intended to limit the scope and/or spirit of the present disclosure.

Data obtaining module 102 is configured to obtain first data from the protected environment, where the first data is associated with at least one entity of the plurality of entities. In some cases, the "first data" may also be referred to as "raw data" or "raw data object (RDO)". In some examples, the data obtaining module 102 is configured to work in conjunction with one or more of the other modules of system 100, such as, but not limited to, entity identification module 101, relationship/link identification module 103, and/or EODF module 106 to process, collect, pull, query, and/or intercept one or more of dataflows and signals that are used to synthesize entities, in accordance with various aspects of the disclosure.

In some cases, obtaining the first data may include intercepting a plurality of dataflows in the protected environment. In some other cases, obtaining the first data may include querying one or more other systems (e.g., a database, a datastore, or another applicable sub-system) to extract raw data. In yet other cases, obtaining the first data may include crawling a file system (e.g., a local file system on a computer or laptop) to read one or more files. In yet other cases, obtaining the first data may include one or more of intercepting signals, collecting signals, and pulling or querying signals, and utilizing the information associated with said signals to extract entities and their links or relationships to one or more other entities. In some cases, the first data (or raw data) may be input into a data processing model, which helps provide context and a "bigger picture" around entities associated with the protected environment, further described below in reference to FIGS. 3A-4B.

In some examples, the system 100 is configured to construct and retain a stateful record of all (or a majority) of the entities within the protected environment, based at least in part on assessing the data and signals flowing in the protected environment. In some cases, one or more of the entities may be "known entities", which may refer to entities that have been previously processed or identified by the system 100. Some non-limiting examples of known entities may include a known person or user, a known computing device associated with a known person/user, a known email account, a known username, a database of known threat actors, known vulnerabilities, known Tactics, Techniques, and Procedures (TTPs), known Indicators of Compromise (IoCs), etc. Furthermore, one or more entities may be "synthetic entities", which may refer to entities that are not currently known or previously processed by the system 100. In some cases, synthetic entities may be linked or associated with a known entity. As an example, if a known entity (e.g., a person 'A') logs into a new laptop (not known) using their email or user account (also known to the system 100), the system may establish a link between the email or user account and the new laptop (e.g., a MAC address of said laptop) and/or a link between the person 'A' and the new laptop. In this case, the new laptop may be referred to as a "synthetic entity" based on its link or relationship with a known entity.

In some embodiments, knowledge related to the entities associated with the protected environment may be manually input (e.g., by a system or IT administrator), automatically input or synced, inferred based on data observation, and/or generated via vulnerability scans and security awareness training. In some embodiments, vulnerability scanning and/or security awareness training may be employed to obtain intelligence about the various entities associated with the protected environment, further described below with reference to FIGS. 4A-B.

Relationship or link identification module 103 may be configured to identify, for each of the plurality of entities, a relationship with at least one other entity of the plurality of entities, wherein the relationship is identified at least in part on the first data. Additional details on the identification of entity links/relationships are described below with reference to FIGS. 3A-4B. In some cases, the system 100 may be configured for Uniform Feature Enriched (UFE) data processing, where UFE data processing includes "entity attribution". Entity attribution serves to associate the collected or obtained data with their related entities. Some non-limiting examples of entity attribution include using a parsed Internet Protocol (IP) address to associate a log to a known server entity; using a parsed login to associate a log to a known person entity; using a parsed phone number to associate a log to a known person entity and/or known mobile device entity.

In some embodiments, identifying the relationship is further based at least in part on determining at least one of one or more strong keys and one or more weak keys for at least a portion of the plurality of entities. In some cases, each of the one or more strong keys (e.g., email address for a person) may be static for a longer duration than each of the one or more weak keys (e.g., dynamically assigned IP addresses). Additionally, or alternatively, each of the one or more strong keys may exhibit a higher level of cardinality than each of the one or more weak keys. In some embodiments, the plurality of entities comprises one or more known entities and one or more synthetic entities. In such cases, the relationship/link identifying module 103 is configured to identify, for at least one of the one or more synthetic entities, a relationship with at least one of the one or more known entities. The relationship/link identifying module 103 may also be configured to identify one or more additional links or relationships for one or more of the plurality of entities, based on assessing fifth information, where the fifth information comprises information related to the one or more strong keys and the one or more weak keys.

In some instances, identifying the link or relationship between entities may comprise identifying a parent-child entity relationship. For instance, the relationship/link identifying module 103 may be configured to determine a parent-child relationship between a child entity (e.g., a user account entity) and a parent entity (e.g., a person entity), based on determining that the user account (e.g., email address) is highly static, which implies a very high likelihood of the user associated with that user account being involved in an event or action when the user account is involved in the same event or action.

Object creation module 104 may be configured to create a plurality of objects (also referred to as processed data objects to differentiate from the raw data objects more clearly or RDOs), wherein each of the plurality of objects is associated with one or more entities of the plurality of entities and at least a portion of the first data. In some cases, each object of the plurality of objects may comprise an enriched object that includes the relevant raw data and one or more features extracted from the raw data. In some cases, the object creation module 104 is configured to work in conjunction with one or more of the entity identification module 101 and the data obtaining module 102. In some cases, obtaining the first data (e.g., RDOs) from the protected environment comprises extracting one or more contextualized features from the first data. Furthermore, extracting the contextualized features comprises one or more of inherent feature extraction and derived feature extraction. In some examples, inherent feature extraction comprises extracting second information related to at least one of an Internet Protocol (IP) address, a Media Access Control (MAC) address, a username, a unique identifier for a user, a phone number, and a domain name (e.g., radicl.io). Additionally, the derived feature extraction comprises extracting second data related to, but not included in, the first data, the second data being different from the second information. As an example, derived feature extraction may include extracting one or more of geolocation data, classification data, known entities data, etc., from the first data. In some embodiments, creating the plurality of objects is based at least in part on obtaining the first data from the protected environment. Additionally, each of the plurality of objects (or processed objects) includes at least a portion of the first data (or raw data) and one or more of the extracted contextualized features.

Information storage module 105 is configured to store first information related to the plurality of entities, the first data, each relationship or link with at least one other entity, and the plurality of objects. In some examples, the first information may be stored in a database or a data store (e.g., shown as data store 323 in FIG. 3A). Specifically, but without limitation, the first information and the plurality of objects may reside within a searchable data store, such as the data store 323 in FIG. 3A. Furthermore, the searchable data store may further include third information related to at least one of: one or more vulnerability reports or records (e.g., known vulnerabilities); one or more threat intelligence reports or records (e.g., a list of known threat actors); a respective attribute of one or more of the plurality of objects; and a respective contextualized attribute of one or more of the plurality of objects. Other types of data, information, etc., may be stored in the searchable data store and the examples listed herein are not intended to limit the scope and/or spirit of the present disclosure.

Entity-oriented data fabric (EODF) module 106 is configured to create the entity-oriented data fabric in the protected environment, based at least in part on storing the first information, where the entity-oriented data fabric comprises a data framework for providing a unified view of at least the plurality of the entities and each relationship or link. In some aspects, creating the EODF facilitates one or more of discovering one or more compromised entities amongst the plurality of entities; identifying, from the plurality of entities, one or more entities whose likelihood of being compromised exceeds a pre-defined threshold; and/or preventing at least one of the plurality of entities from being compromised.

In some cases, the system 100 is configured to identity entities that are susceptible to, or suspected of, being comprised based on assessing the EODF. For instance, the system 100 is configured to leverage cross entity relationships to predict other entities likely to be compromised, where the cross-entity relationships may be established during the process of creating the EODF. As an example, a person (e.g., employee of an organization) may have an enterprise account and may use a specific laptop or mobile device. In such cases, if the person's enterprise account is compromised (e.g., due to a hacking event), then the system 100 may also identify that one or more of the laptop or computing device utilized by the person, a server accessed by the person, and/or other accounts (e.g., email account, account for a cloud service provider) associated with the person may also be compromised (or have a higher likelihood of being compromised) based on identifying the link or relationship between the person, the compromised enterprise account, and other entities (e.g., email account, laptop or another computing device, server) associated with the person and/or the compromised enterprise account.

Risk level identification module 108 is configured to identify a risk level for at least one entity of the plurality of entities. In some cases, the risk level may comprise a vulnerability risk level, e.g., how vulnerable is a particular entity to being compromised, for instance, due to a hacking event as a result of the use of a weak password or not using multi-factor authentication. Additionally, or alternatively, the risk level may comprise an attack risk level, e.g., a severity level associated with a prior or on-going attack from a malicious entity. In some cases, the risk level (i.e., vulnerability and/or attack risk level) may be selected from a group consisting of a Critical Risk Level, a High-Risk Level, a Medium Risk Level, a Low Risk Level, or a Minimum to None Risk Level. It should be noted that the risk levels described herein are exemplary only and not intended to limit the scope and/or spirit of the present disclosure. In other words, a greater level of granularity (i.e., a greater number of individual risk levels) or a lower level of granularity (i.e., a lower number of individual risk levels) may be utilized without departing from the spirit of the disclosure. In one non-limiting example, the attack risk level may be selected as one of Critical, High, Medium, Low, or None, while the vulnerability risk level may be selected as one of High, Medium, or Low. In another non-limiting example, the attack risk level may be selected as one of High, Medium, or Low, while the vulnerability risk level may be selected as one of Critical, High, Medium, Low, or None. In yet another limiting example, both the attack and vulnerability risk levels may be selected as one of High, Medium, or Low.

Attacker/Malicious entity identification module 109 may be configured to identify one or more of a malicious entity and an attacker entity (e.g., shown as attacker entity 313-*a*, attacker entity 313-*b* in FIG. 3A) from the plurality of entities. As noted above, the at least one of a malicious entity and an attacker entity may be selected from a group consisting of at least one malicious hacker, a computing device associated with the at least one malicious hacker, cloud service infrastructure utilized by the at least one malicious hacker, one or more known threat actors, a malware program, a software program (e.g., a ransomware software program, or another applicable "hostile" software program, such as a computer virus), a program or code to exploit a software vulnerability or security flaw (e.g., in an operating system), a nation-state adversary, and one or more known security vulnerabilities.

User Interface (UI) display module 110 may be configured to provide at least a portion of the first information on a computing device, where the providing comprises providing one or more of a visualization, a graph, and a table via a user interface (UI) on the computing device.

In some aspects, this disclosure is intended to provide consistent and dynamic application of contextualized data features to disparate sources of data via a uniform labeling model. This uniform labeling may help provide features and context about the underlying data object, which is relatable to other data objects. In this way, aspects of the present disclosure can help provide a contextual metadata depiction of underlying data objects, which may form strong relationships with other data objects, which can help facilitate more accurate machine-based analytics, specifically in cross-device correlative analytics and the application of machine learning.

For example, in some embodiments, feature extraction module 111 may be configured to extract one or more contextualized features from the first data (e.g., raw data objects). As noted above, extracting the contextualized features comprises one or more of inherent feature extraction and derived feature extraction, where the inherent feature extraction comprises extracting second information related to at least one of an Internet Protocol (IP) address, a Media Access Control (MAC) address, a username, a unique identifier for a user, a phone number, and a domain name; and the derived feature extraction comprises extracting second data related to, but not included in, the first data, where the second data is different from the second information.

Furthermore, in some embodiments, metadata module 112 is configured to obtain metadata information for at least a portion of the plurality of entities. In some instances, creating the entity-oriented data fabric (e.g., by the EODF module 106) is based at least in part on obtaining the metadata information.

Querying module 113 is configured to receive a request for retrieving, from the searchable data store, fourth information, where the fourth information comprises information related to one or more of a first entity (e.g., a person entity, a computing device or machine entity), a first object (e.g., a processed object created from a RDO and its associated extracted contextualized features), a first vulnerability report, a first threat intelligence report, an attribute of the first object (e.g., RDO), and a contextualized attribute of the first object. In some instances, the querying module 113 may work in conjunction with the data obtaining module 102 to pull or query signals, data, etc., from the protected environment, which is then used to synthesize information related to the entities and create the EODF, in accordance with various aspects of the disclosure.

Strong/Weak Key Identification Module 114 is configured to determine at least one of one or more strong keys and one or more weak keys for at least a portion of the plurality of entities. As noted above, each of the one or more strong keys may be static for a longer duration than each of the one or more weak keys and/or each of the one or more strong keys exhibits a higher level of cardinality than each of the one or more weak keys. Additional details on the strong and weak key identification is described below with reference to FIGS. 3A-4B.

In some implementations, computing platform(s) 102, remote computing platform(s) 144, and/or external resources 130 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which computing platform(s) 102, remote platform(s) 144, and/or external resources 130 may be operatively linked via some other communication media.

A given remote platform 144 may include one or more processors configured to execute computer program modules. The computer program modules may be configured to enable an expert or user associated with the given remote platform 144 to interface with system 100 and/or external resources 130, and/or provide other functionality attributed herein to remote platform(s) 104. By way of non-limiting example, a given remote platform 144 and/or a given computing platform 102 may include one or more of a server, a desktop computer, a laptop computer, a handheld computer, a tablet computing platform, a NetBook, a Smartphone, and/or any other applicable computing platform.

External resources 130 may include sources of information outside of system 100, external entities participating with system 100, and/or other resources. In some implementations, some or all of the functionality attributed herein to external resources 130 may be provided by resources included in system 100.

Computing platform(s) 102 may include electronic storage 132, one or more processors 134, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 132 may comprise non-transitory storage media that electronically stores information. The electronic storage media of electronic storage 132 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from computing platform(s) 102, information received from remote platform(s) 104, and/or other information that enables computing platform(s) 102 to function as described herein.

Processor(s) 134 may be configured to provide information processing capabilities in computing platform(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute modules 101, 102, 103, 104, 105, 106, 107, 108, 109, 110, 11, 112, 113, 114, and/or other modules. Processor(s) 134 may be configured to execute modules 101, 102, 103, 104, 105, 106, 107, 108, 109, 110, 11, 112, 113, 114, and/or other modules by software; hardware; firmware; some combination of software, hardware, and/or firmware; and/or other mechanisms for configuring processing capabilities on processor(s) 134. As used herein, the term “module” may refer to any component or set of components that perform the functionality attributed to the module. This may include one or more physical processors during execution of processor readable instructions, the processor readable instructions, circuitry, hardware, storage media, or any other components.

It should be appreciated that although modules 101, 102, 103, 104, 105, 106, 107, 108, 109, 110, 11, 112, 113, and/or 114 are illustrated in FIG. 1 as being implemented within a single processing unit, in implementations in which processor(s) 134 includes multiple processing units, one or more of modules 101, 102, 103, 104, 105, 106, 107, 108, 109, 110, 11, 112, 113, and/or 114 may be implemented remotely from the other modules. The description of the functionality provided by the different modules 101, 102, 103, 104, 105, 106, 107, 108, 109, 110, 11, 112, 113, and/or 114 described below is for illustrative purposes, and is not intended to be limiting, as any of modules 101, 102, 103, 104, 105, 106, 107, 108, 109, 110, 11, 112, 113, and/or 114 may provide more or less functionality than is described. For example, one or more of modules 101, 102, 103, 104, 105, 106, 107, 108, 109, 110, 11, 112, 113, and/or 114 may be eliminated, and some or all of its functionality may be provided by other ones of modules 101, 102, 103, 104, 105, 106, 107, 108, 109, 110, 11, 112, 113, and/or 114. As another example, processor (s) 134 may be configured to execute one or more additional modules that may perform some or all of the functionality attributed below to one of modules 101, 102, 103, 104, 105, 106, 107, 108, 109, 110, 11, 112, 113, and/or 114.

FIGS. 2A, 2B, 2C, 2D, 2E, 2F, 2G, and/or 2H illustrates method(s) 200 for creating an entity-oriented data fabric using a computing platform (e.g., computing platform 102 in FIG. 1), in accordance with various aspects of the present disclosure. The operations of method(s) 200 presented below are intended to be illustrative. In some implementations, method(s) 200 may be accomplished with one or more additional operations not described, and/or without one or more of the operations discussed. Additionally, the order in which the operations of method(s) 200 are illustrated in FIGS. 2A, 2B, 2C, 2D, 2E, 2F, 2G, and/or 2H and described below is not intended to be limiting.

In some implementations, method(s) 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method(s) 200 in response to instructions stored electronically on an electronic storage medium. The one or more processing devices may include one or more devices configured through hardware, firmware, and/or software to be specifically designed for execution of one or more of the operations of method(s) 200.

FIG. 2A illustrates a method 200-*a* for creating and/or managing an entity-oriented data fabric or EODF using a computing platform (e.g., computing platform 102 in FIG. 1), in accordance with various aspects of the disclosure.

A first operation 202 may include identifying a plurality of entities associated with the protected environment. First operation 202 may be performed by one or more hardware processors configured by machine-readable instructions including a module that is the same as or similar to entity identification module 101, in accordance with one or more implementations.

A second operation 204 may include obtaining first data from the protected environment, wherein the first data is associated with at least one entity of the plurality of entities. Second operation 204 may be performed by one or more hardware processors configured by machine-readable instructions including a module that is the same as or similar to data obtaining module 102, in accordance with one or more implementations.

A third operation 206 may include identifying, for each of the plurality of entities, a relationship with at least one other entity of the plurality of entities, wherein the relationship is identified at least in part on the first data. Third operation 206 may be performed by one or more hardware processors configured by machine-readable instructions including a module that is the same as or similar to relationship/link identification module 103, in accordance with one or more implementations.

A fourth operation 208 may include creating a plurality of objects, wherein each of the plurality of objects is associated with one or more entities of the plurality of entities and at least a portion of the first data. Fourth operation 208 may be performed by one or more hardware processors configured by machine-readable instructions including a module that is the same as or similar to object creation module 104, in accordance with one or more implementations.

A fifth operation 210 may include storing first information related to the plurality of entities, the first data, each relationship with at least one other entity, and the plurality of objects. Fifth operation 210 may be performed by one or more hardware processors configured by machine-readable instructions including a module that is the same as or similar to information storage module 105, in accordance with one or more implementations.

A sixth operation 212 may include creating the entity-oriented data fabric in the protected environment, based at least in part on storing the first information, wherein the entity-oriented data fabric comprises a data framework for providing a unified view of at least the plurality of the entities and each relationship. Sixth operation 212 may be performed by one or more hardware processors configured by machine-readable instructions including a module that is the same as or similar to entity-oriented data fabric or EODF module 106, in accordance with one or more implementations.

A seventh operation 214 may include providing at least a portion of the first information on a computing device, wherein the providing comprises providing one or more of a visualization, a graph, and a table via a user interface (UI) on the computing device. Seventh operation 214 may be performed by one or more hardware processors configured by machine-readable instructions including a module that is the same as or similar to UI Display Module 110, in accordance with one or more implementations.

Figure 2B:
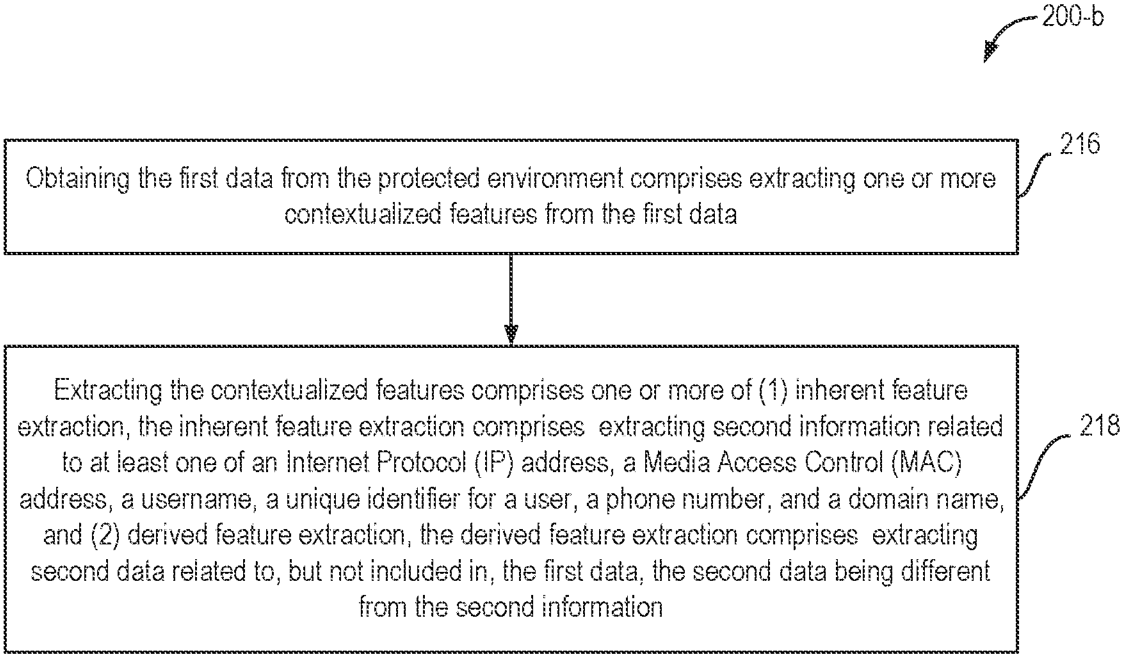
FIG. 2B illustrates a second method for creating an EODF in a protected environment, in accordance with various aspects of the disclosure.

FIG. 2B illustrates method 200-*b*, in accordance with one or more implementations.

A first operation 216 may include obtaining the first data from the protected environment, wherein obtaining the first data comprises extracting one or more contextualized features from the first data. First operation 216 may be performed by one or more hardware processors configured by machine-readable instructions including a module that is the same as or similar to one or more of data obtaining module 102 and feature extraction module 111, in accordance with one or more implementations.

A second operation 218 may include extracting the contextualized features, where extracting the contextualized features comprises one or more of (1) inherent feature extraction and (2) derived feature extraction. In some examples, the inherent feature extraction comprises extracting second information related to at least one of an Internet Protocol (IP) address, a Media Access Control (MAC) address, a username, a unique identifier for a user, a phone number, and a domain name. Furthermore, the derived feature extraction comprises extracting second data related to, but not included in, the first data, the second data being different from the second information. Second operation 218 may be performed by one or more hardware processors configured by machine-readable instructions including a module that is the same as or similar to message proxying module 124, in accordance with one or more implementations.

Figure 2C:
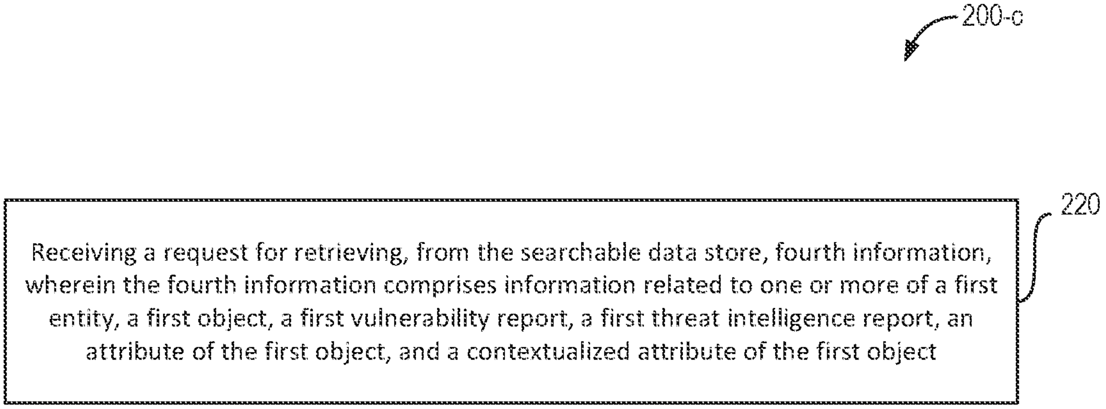
FIG. 2C illustrates a third method for creating an EODF in a protected environment, in accordance with various aspects of the disclosure.

FIG. 2C illustrates method 200-*c*, in accordance with one or more implementations.

A first operation 220 may include receiving a request for retrieving, from the searchable data store, fourth information, wherein the fourth information comprises information related to one or more of a first entity, a first object, a first vulnerability report, a first threat intelligence report, an attribute of the first object, and a contextualized attribute of the first object. The first operation 220 may be performed by one or more hardware processors configured by machine-readable instructions including a module that is the same as or similar to one or more UI display module 110, information storage module 105, and/or querying module 113, in accordance with one or more implementations.

Figure 2D:
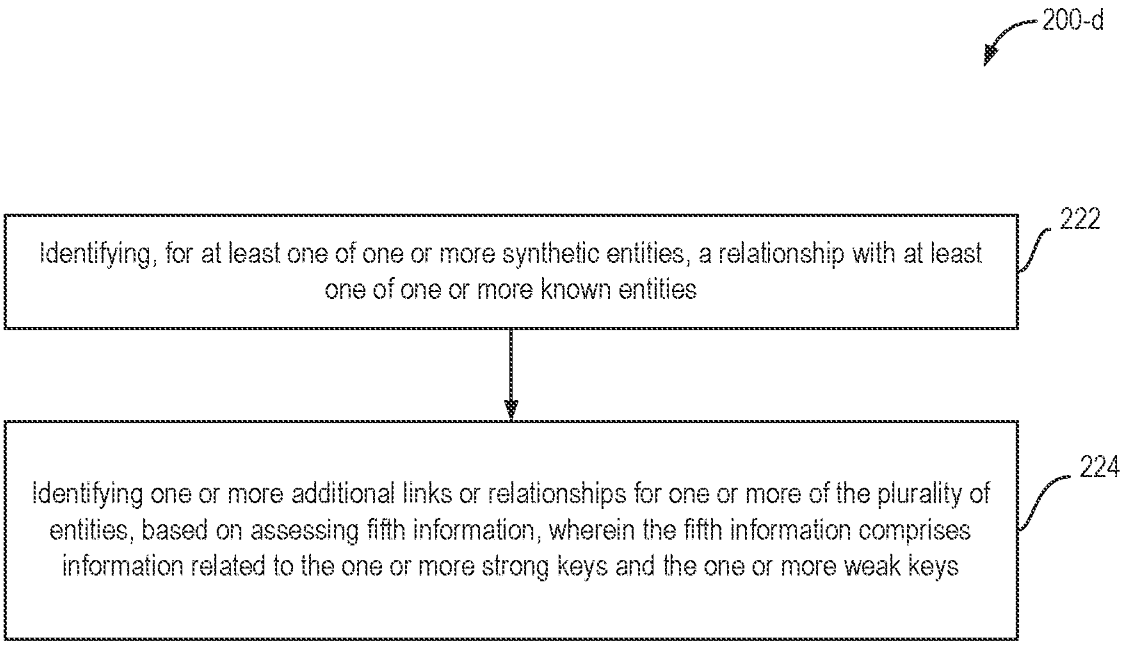
FIG. 2D illustrates a fourth method for creating an EODF in a protected environment, in accordance with various aspects of the disclosure.

FIG. 2D illustrates method 200-*d*, in accordance with one or more implementations.

A first operation 222 may include identifying, for at least one of one or more synthetic entities, a relationship with at least one of one or more known entities. First operation 222 may be performed by one or more hardware processors configured by machine-readable instructions including a module that is the same as or similar to one or more of relationship/link identification module 103, EODF module 106, and/or strong/weak key identification module 114, in accordance with one or more implementations.

A second operation 224 may include identifying one or more additional links or relationships for one or more of the plurality of entities, based on assessing fifth information, wherein the fifth information comprises information related to the one or more strong keys and the one or more weak keys. Second operation 224 may be performed by one or more hardware processors configured by machine-readable instructions including a module that is the same as or similar to strong/weak key identification module 114, in accordance with one or more implementations.

Figure 2E:
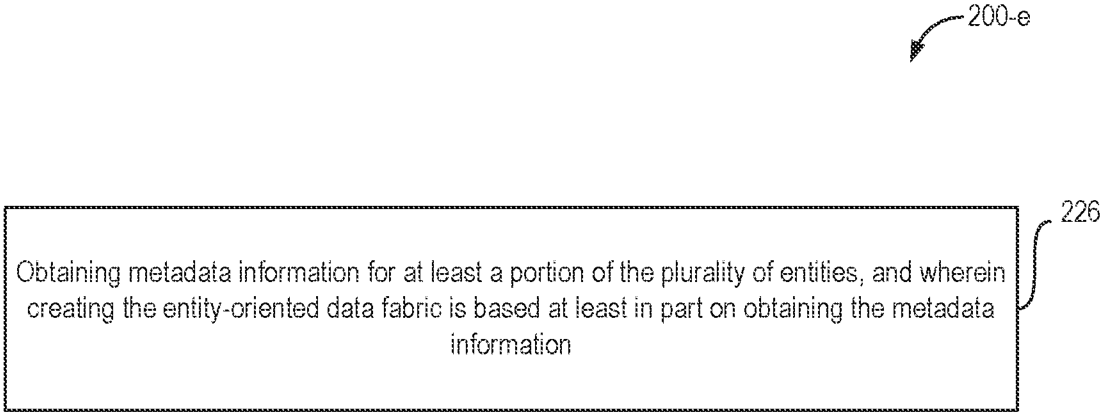
FIG. 2E illustrates a fifth method for creating an EODF in a protected environment, in accordance with various aspects of the disclosure.

FIG. 2E illustrates method 200-*e*, in accordance with one or more implementations.

A first operation 226 may include obtaining metadata information for at least a portion of the plurality of entities, wherein creating the entity-oriented data fabric is based at least in part on obtaining the metadata information. First operation 226 may be performed by one or more hardware processors configured by machine-readable instructions including a module that is the same as or similar to one or more of EODF module 106 and metadata module 112, in accordance with one or more implementations.

FIG. 2F illustrates method 200-*f*, in accordance with one or more implementations.

In this example, a first operation 228 comprises receiving and/or extracting Raw Data Message(s) containing Analytics Value(s) from multiple information or data sources (e.g., file based, Application Programming Interface (API) based, query based, network transmission or stream based, to name a few non-limiting examples). In some instances, a message (e.g., raw data message) may comprise a discrete package of data containing analytics value. Some non-limiting examples of raw data messages may comprise a log message, an alarm, a record, a report line, a text message, and/or a chat message. First operation 228 may be performed by one or more hardware processors configured by machine-readable instructions including a module that is the same as or similar to one or more of entity identification module 101, data obtaining module 102, and/or object creation module 104, in accordance with one or more implementations.

A second operation 230 comprises preparing one or more Raw Data Objects (RDOs) from the Raw Data Message(s). In some embodiments, each discrete Raw Data Message may be prepared for EODF processing as a "raw data object". Additionally, each RDO may comprise (or carry with it) the original source of the data and the timestamp of the data normalized to an absolute time standard (e.g., Coordinated Universal Time or UTC). Furthermore, each RDO may be assigned to one or more data streams that carry additional contextual information about the type of data contained in the RDO (e.g., data type, information subsystem, error severities, etc.). Second operation 230 may be performed by one or more hardware processors configured by machine-readable instructions including a module that is the same as or similar to object creation module 104, in accordance with one or more implementations.

As seen in FIG. 2F, a third operation 231 may comprise a plurality of sub-operations (i.e., operations 232 through 235), described in further detail below. Here, the third operation 231 comprises creating one or more Entity Oriented Data Objects (EODOs), also referred to as Entity Enriched Data Objects (EEDOs). In some cases, the terms EODO and EEDO may be used interchangeably throughout the present disclosure. Third operation 231 may be performed by one or more hardware processors configured by machine-readable instructions including a module that is the same as or similar to object creation module 104, in accordance with one or more implementations.

In some cases, creating the one or more EODOs (or EEDOs) in operation 231 may comprise inherent entity extraction (operation 232), where the inherent entity extraction is based on processing the one or more RDOs. For instance, the system 100 may be configured to process RDOs and/or Entities of various types. Furthermore, Entities may be populated with properties/features, where the value of the property/feature exists in the RDO. Operation 232 may be performed by one or more hardware processors configured by machine-readable instructions including a module that is the same as or similar to object creation module 104 and/or feature extraction module 111, in accordance with one or more implementations.

In some cases, creating the one or more EODOs or EEDOs may comprise derived entity extraction and/or derived feature extraction, based on processing the one or more RDOs (operation 233). In some cases, information contained in the RDO(s) may be used to infer and derive additional entities and/or add properties/features to existing entities. Operation 233 may be performed by one or more hardware processors configured by machine-readable instructions including a module that is the same as or similar to object creation module 104 and/or feature extraction module 111, in accordance with one or more implementations.

Next, creating the one or more EODOs or EEDOs may comprise relationship or contextual link(s) extraction based on processing the one or more RDOs (operation 234). Operation 234 may be performed by one or more hardware processors configured by machine-readable instructions including a module that is the same as or similar to object creation module 104, relationship/link identification module 103, and/or feature extraction module 111, in accordance with one or more implementations. In some embodiments, information contained in the RDO, or inferred/derived from the RDO, may be used to create contextual links between entities. Further details on such relationship and/or contextual link extraction is described below with reference to at least FIGS. 3A, 3B, 4A, and/or 4B. As noted above, links may describe a relationship that exists between two entities. Links may also carry additional properties/features that can provide further information on the relationship, for instance: amount of data transferred between two entities; amount of time one entity interacted with another entity, and/or error conditions occurring with an interaction between two entities, to name a few non-limiting examples.

Lastly, creating the one or more EODOs or EEDOs may comprise identifying and/or associating known entities from information contained within entities and/or links (operation 235), herein referred to as Known Entity Association. Operation 235 may be performed by one or more hardware processors configured by machine-readable instructions including a module that is the same as or similar to entity identification module 101, object creation module 104, relationship/link identification module 103, and/or feature extraction module 111, in accordance with one or more implementations. Information contained within Entities and Links can be used to identify and associate a pre-existing, cataloged, "Known Entity" with another Entity constructed at run time (i.e., Synthetic Entity). The Known Entity may comprise additional information about the real-world entity (e.g., the actual Machine, Person, etc.) that may or may not be included in the information obtained from processing the one or more RDOs (i.e., via operations 232 through 235).

In some instances, operations 232 through 235 may be done via a configuration process. In some cases, the system or platform, such as system 100, may be configured to create "Mappings" that describe and determine the Entities and/or Links to extract. While not necessary, in some cases, the one or more mappings may be defined by a human (e.g., a designated user). Furthermore, AI technology may be employed to further enhance this mapping process. For example, an AI module or AI server may be employed to suggest new and/or improved mappings based on observing human-build mappings against data being processed, and feedback on the accuracy of this processing. Furthermore, the AI module/server may be configured to automatically create and/or continuously evolve mappings based on access to a larger set of data, across more disparate environments, with a larger learning set, and human feedback around the accuracy of AI generated mappings over time. In this way, aspects of the present disclosure also support the training of AI models such that, over time, sources of RDOs can be automatically converted into EEDOs and incorporated into the EODF with minimal to no human effort.

FIG. 2G illustrates method 200-*g*, in accordance with one or more implementations.

A first operation 236 comprises storing information pertaining to at least the EODOs in a searchable data store that supports an Entity Aware Search Syntax (EASS) or query language (QL), where the EASS enables data extraction using one or more of RDO properties (e.g., Data source, timestamp, stream, etc.), Entity Types, Entity Properties, Link Types, Entity-To-Entity Link Relationships, and/or Link Properties. In some cases, searches using EASS may be executed using one or more of a command line interface, a Graphical User Interface (GUI), and programmatic actions or AI interactions.

Operation 236 may be performed by one or more hardware processors configured by machine-readable instructions including a module that is the same as or similar to EODF module 106, information storage module 105, object creation module 104, relationship/link identification module 103, querying module 113, UI display module 110, and/or feature extraction module 111, in accordance with one or more implementations.

FIG. 2H illustrates method 200-*h*, in accordance with one or more implementations.

A first operation 238 comprises extracting and/or associating one or more of entities and links contained with one or more workflows, where each of the one or more workflows comprises one of a manual workflow or an automated workflow. In some instances, such a design helps provides a uniform way of enriching workflow objects. For example, a second operation 240 comprises enriching one or more workflow objects, based at least in part on passing information related to entity properties and/or link properties into the one or more workflows. In some cases, workflow(s) can be tailored to more specific outcomes, based at least in part on passing information related to the properties of entities and/or links into the workflows. Some non-limiting examples include: Automatically Disable Account for Person.Login; Automatically Quarantine Host for Machine.IPAddress; and Automatically Delete Email for Person.Email_Address and Email.Subject.

Operation 238 may be performed by one or more hardware processors configured by machine-readable instructions including a module that is the same as or similar to EODF module 106, information storage module 105, object creation module 104, relationship/link identification module 103, querying module 113, UI display module 110, and/or feature extraction module 111, in accordance with one or more implementations.

Figure 3B:
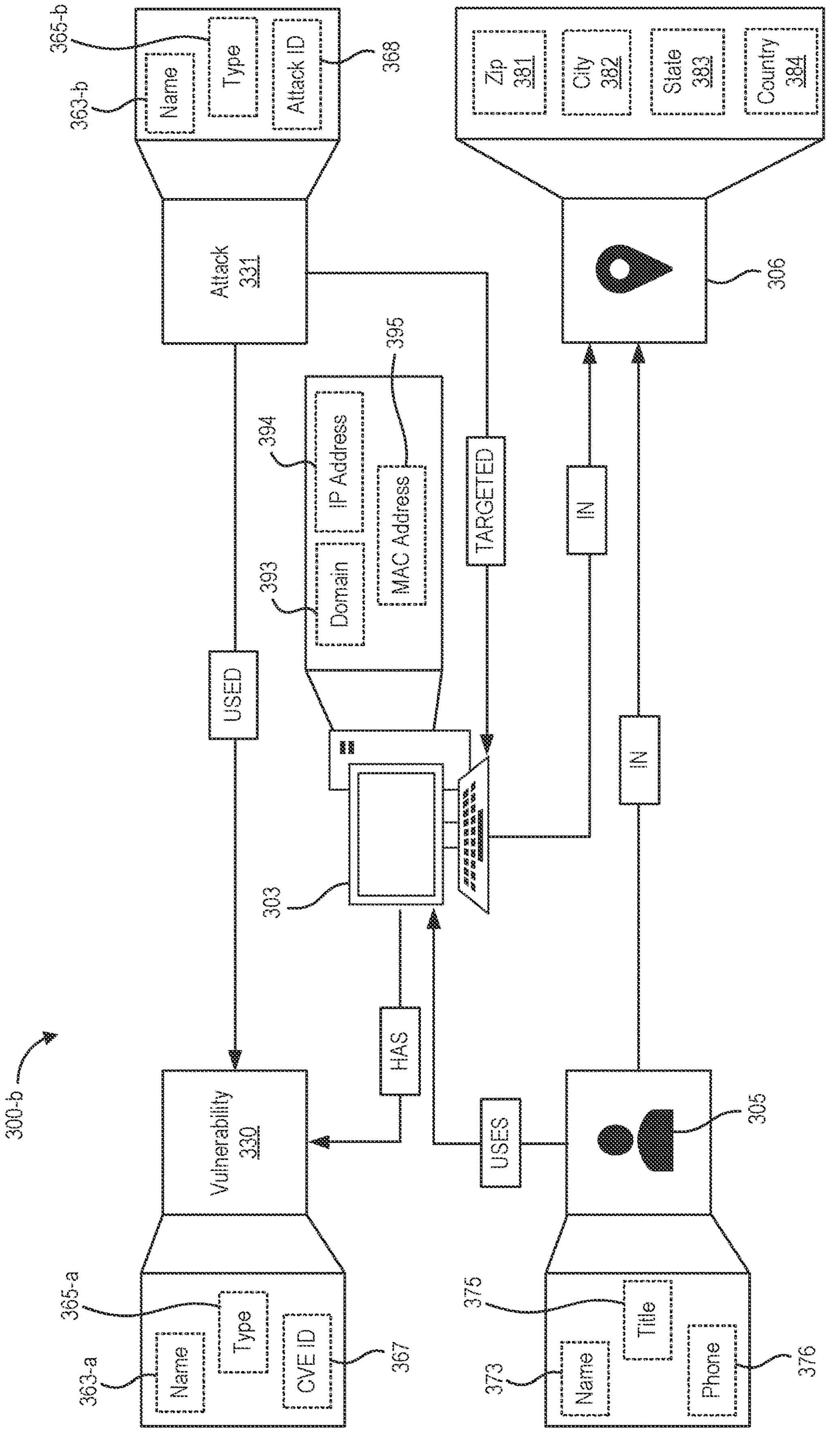
FIG. 3B illustrates a block diagram showing one or more entities and the various types of data that can be collected in context of the one or more entities, which can then be processed to create an EODF, in accordance with various aspects of the disclosure.

Turning now to FIG. 3B, which illustrates a block diagram 300-*b* showing one or more entities and the various types of data that can be collected in context of the one or more entities, which can then be processed to create an EODF (e.g., shown as EODF 302 in FIG. 3A), in accordance with various aspects of the disclosure. In this example, a first entity 305 (or user 305) uses a second entity 303 (or computing device 303). The first entity 305 is associated with a name 373 (e.g., John Doe), a title (e.g., Staff Engineer), and a phone number 376. Additionally, the second entity 303 is associated with a domain 393, an IP address 394, and a MAC address 395. Furthermore, as seen in FIG. 3B, the first entity 305 and the second entity 303 are in a location 306, where the location 306 is associated with one or more of a zip code 381, a city 382, a state 383, and a country 384.

FIG. 3B also shows how the system (e.g., system 100 in FIG. 1) can collect additional data associated with a vulnerability 330 and an attack 331 in creating the EODF, in accordance with various aspects of the disclosure. In this example, the second entity 303 (or computing device 303) has a vulnerability 330, where the vulnerability 330 comprises a vulnerability name 363-*a*, a vulnerability type 365-*a*, and a Common Vulnerabilities and Exposures (CVE) ID 367. Additionally, the second entity 303 is targeted by the attack 331, where the attack 331 comprises an attack name 363-*b*, an attack type 365-*b*, and an attack ID 368. In this way, the system of the present disclosure enables the creation of an entity-oriented data fabric (EODF), which allows the representation of data collected and/or obtained from various disparate sources in the context of the involved entities. For instance, as seen in FIG. 3B, data associated with a first entity (e.g., a person), a second entity (e.g., a machine), a third entity (e.g., a vulnerability), a fourth entity (e.g., an attacker), and/or a fifth entity (e.g., a location) can be obtained to not only create the EODF, but also identify entity-to-entity links, in accordance with one or more implementations.

Some non-limiting examples of features/types associated threat entities include: Name/String; and VendorID/String.

Some non-limiting examples of features/types associated with attack entities include: Name/String; VendorID/String; Description/String; VendorID/String; MitreAttackID; Type/Reference; Risk/Reference; and Severity/String.

Some non-limiting examples of vulnerability entities include CVE/String; Risk/Reference; Name/String; and Description/String.

Returning now to FIG. 3A, which illustrates an exemplary block diagram 300-*a* showing an EODF 302 that can be created using the system 301 (also shown as system 100 in FIG. 1), where the EODF includes a plurality of entities and a plurality of links or relationships between the plurality of entities, in accordance with various aspects of the disclosure. As seen in FIG. 3A, a plurality of entities including one or more client entities and one or more external entities may be associated with a protected environment 337. In one non-limiting example, the protected environment 337 may comprise an internal network for an enterprise or organization, although other types of protected environments are also contemplated in different embodiments.

In some embodiments, the system 301 is similar or substantially similar to the system 100 described in relation to FIG. 1. Furthermore, the system 301 may include or implement aspects of one or more of the modules 101, 102, 103, 104, 105, 106, 107, 108, 109, 110, 11, 112, 113, and/or 114 described above in relation to FIG. 1. In some cases, the system 301 is configured to obtain raw data (also referred to as raw data objects or RDOs) from the various entities, including the client entities 305-*a* through 305-*c*, the external entities 305-*d* through 305-*f*, and one or more attacker entities 313-*a* and 313-*b*. In some cases, the system 301 collects and obtains (e.g., system 301 monitors data traffic on network adapter associated with a computing device, a router, etc.; system 301 monitors data signals flowing between computing devices, servers, etc., operating in the protected environment; system 301 crawls file systems and reads files, metadata related to files, etc., to name a few non-limiting examples) data via a data processing pipeline, where the data processing pipeline is represented by the various data flows 309 in FIG. 3A. For example, the system 300-*a* may obtain data related to: a first client entity 305-*a* via a first data flow 309-*a*, a second client entity 305-*b* via a second data flow 309-*b*, a third client entity 305-*c* via a third data flow 309-*c*, a first external entity 305-*d* via a fourth data flow 309-*d*, a second external entity 305-*e* via a fifth data flow 309-*e*, and a third external entity 305-*f* via a sixth data flow 309-*f*. In one non-limiting example, the client entity 305-*a* may comprise a computing device or machine (e.g., a laptop) and the system 301 may be configured to determine data related to one or more of a Machine Type, a Machine Name, a Machine IP address, a Machine Domain, a Machine MAC Address, and/or any other relevant information associated with the first client entity 305-*a*. Additionally, the second client entity 305-*b* may comprise a person, where the person is associated with one or more of a first name, a middle name, a last name, a full name, a phone number, and/or a location (optional), to name a few non-limiting examples. In some cases, the second client entity 305-*b* may be linked to the first client 305-*a*, as shown by 309-*a*. For example, the person (i.e., second client entity 305-*b*) may have logged in, logged out, and/or used the computing device (i.e., first client entity 305-*a*). In some cases, the third client entity 305-*c* may comprise a user account and/or an email address associated with the second client entity 305-*b* (e.g., a person). Furthermore, the second entity 305-*b* may have logged into their user account or email address (i.e., the third entity 305-*c*) via computing device 305-*a*, which is depicted by the links 368-*a*, 368-*b*, and 368-*c* in FIG. 3A.

The system 301 may also collect data associated with or linked to one or more entities that are external to the protected environment. In some embodiments, such entities may include one or more entities (e.g., external entities 305-*d*, 305-*e*, 305-*f*) selected from a group consisting of a cloud service infrastructure associated with at least one cloud service provider, a cloud user account for the person/client entity 305-*a*, an Information Technology (IT) infrastructure associated with at least one customer, and a supply chain IT infrastructure associated with the at least one customer. Additionally, or alternatively, the second set of entities includes at least one entity comprising one of a malicious entity and an attacker entity (e.g., attacker entity 313-*a*, attacker entity 313-*b*), wherein the at least one of a malicious entity and an attacker entity is selected from a group consisting of at least one malicious hacker, a computing device associated with the at least one malicious hacker, cloud service infrastructure utilized by the at least one malicious hacker, one or more known threat actors, a malware program, a software program, a program or code to exploit a software vulnerability or security flaw, a nation-state adversary, and one or more known security vulnerabilities. It should be noted that other types of entities besides the ones described herein are contemplated in different embodiments. For instance, in the example shown in FIG. 3A, the known attacker entity 313-*a* (e.g., a hacker entity, an IP address of a known attacker entity) has attacked (319-*a*) the external entity 305-*f*. Furthermore, the attacker entity 313-*b* has targeted (319-*b*) the client entity 305-*c*.

In some embodiments, the data processing pipeline (e.g., shown by 309-*d*, 309-*e*, 309-*f*, 309-*h*, 309-*i*) may be used to obtain the raw data (or RDOs) from the external entities and the attacker entities. In some cases, the system 301 is configured to extract contextualized features from the raw data, where extracting the contextualized features may include inherent feature extraction and derived feature extraction. For instance, the system 301 may extract features resident in the raw data (e.g., IP addresses, usernames, domain names, file names, etc.), herein referred to as inherent feature extraction. In some cases, the system 301 may also extract features that are not resident in, but still related to the raw data, herein referred to as derived feature extraction. In some cases, derived feature extraction may include obtaining one or more of geolocation information (e.g., from a mobile device), classification information, and information related to known entities.

As used herein, the terms "raw data" or "RDO" may refer to data that is obtained, collected, or received by the system 301 and which may be further processed by the platform or system. Some non-limiting examples of RDOs include Log Messages, Flow Messages, Vulnerability Report Record (e.g., this host is known to be vulnerable to an attack 'X'), Threat Intelligence Report Record (e.g., this IP address is known to be malicious). Furthermore, in some cases, each of the one or more RDOs may be associated with one or more object properties, where the object properties may include one or more of a timestamp (e.g., timestamp when the RDO was collected), a source (e.g., a data object source pertaining to the RDO), and any other applicable properties (e.g., log message pertaining to the RDO, a record pertaining to the RDO, etc.).

In some cases, the RDOs obtained by the system 301 may be processed to create a plurality of processed objects, where each of the plurality of processed objects may include an RDO and its extracted features. In some examples, the processed objects may be persisted to hot and/or warm and/or cold storage based on a data management configuration. Additionally, or alternatively, one or more of the plurality of processed objects (e.g., Entity-Oriented Data Object or EODO) may be forwarded (e.g., to a searchable data store that supports an Entity Aware Search Syntax or EASS) for additional stream-based analytics for real-time threat detection.

As used herein, the term “hot storage” may refer to a storage tier that contains the most recent and/or frequently accessed data, provides low latency and high throughput for search operations, consists of primary shards that efficiently handle read and write operations, and/or processes queries in real-time or substantially real-time to deliver immediate search results. As used herein, the term “warm storage” may refer to a storage tier that stores less frequently accessed, but still relevant data. Warm storage may have slightly higher latency compared to hot storage, but lower latency than cold storage. As used herein, the term “cold storage” may refer to a storage tier that is designed for historical or rarely accessed data that must still be retained. Cold storage typically has the highest latency (i.e., when compared to hot and warm storage).

In some examples, a user (e.g., a system or IT administrator) can search the data store 323 for objects having certain properties, attributes, values, etc. As an example, the user can use a query language to search the data store 323 for all objects (e.g., RDOs, processed objects) containing a specific IP address (e.g., 192.168.2.1) in the context of “Is Server”, which results in the system 301 returning information on one or more objects that meet both the IP address and Server criteria. In another non-limiting example, the user can search for all objects containing a specific username (e.g., lucy) in the context of “Permissions Changed”. In some embodiments, the system 301 may provide the information obtained in response to the user's queries via a UI on a computing device. For instance, data may be presented in a UI as individual and related processed objects. In some cases, the search results may be displayed in a table format, where the table comprises one or more columns (e.g., one column for each feature of the processed object) and one or more rows (e.g., one row per context). Additionally, or alternatively, the search results may be represented in a graph view showing the various features/properties of the processed objects within a collection of processed objects.

In some cases, the terms “feature”, “contextualized feature”, and “contextualized data feature tag (CDF)” may be used interchangeably throughout the disclosure and may refer to a contextualized attribute of a data object, such as, but not limited to, a raw data object or RDO. Some non-limiting examples of a CDF may include an IP address of an attacker entity, an IP address of a server (e.g., IP address 394 of entity 303 in FIG. 3B), a user who performed a particular action (e.g., user entity 305 who used entity 303 in FIG. 3B, a user who logged in, a user who clicked on a phishing link), a user who was impacted by a certain action (e.g., user 305 impacted by attack 331 in FIG. 3B, a user who was a victim of financial fraud since they inadvertently installed ransomware on their computing device), a file that was read, a file that was written, a file that was overwritten, to name a few non-limiting examples.

As noted above, a processed object may originate from an RDO (e.g., a log message). In some instances, the system 301 may be configured to collect one or more RDOs from one or more data sources and assign each of the one or more RDOs to a data stream. In such cases, the processed object may comprise information about one or more of the data source and the data stream (e.g., Apache Access Logs, O365 Authentication Logs, to name two non-limiting examples) for the corresponding RDO. The processed object may also include information about the activity or event reported within the RDO, in some embodiments. In some cases, the system 301 is configured to extract at least a portion of the analytics data within the RDO into features or CDFs. In some instances, features or CDFs may be contained within synthetic entities (or sEntities), which may be automatically created and described within the processed objects. In some cases, synthetic entities (or sEntities) may be resolved and associated with known entities (or kEntities). As used herein, the term “known entity” or “kEntity” may refer to an entity that is previously known to (or recognized by) the system. In some aspects, an entity (e.g., a known person, a known computing device or mobile device) for which the system has some prior knowledge may be referred to as a “kEntity”.

In some cases, the system 301 is configured to identify one or more relationships or links (e.g., links 368-*a*, 368-*b*, 368-*c*, 368-*d*, 368-*e*, 368-*f*, 368-*g*, and/or 368-*h* in FIG. 3A) between the plurality of entities associated with the protected environment, where the plurality of entities may include known entities (e.g., known person, such as client entity 305-*a*) and synthetic entities (e.g., user account, such as client entity 305-*c*). Furthermore, synthetic entities can be linked to other synthetic entities with a contextual action describing their link or relationship (e.g., a user who performed some action, a user who was impacted by some action, an IP address was an attacker of another IP address). There are various ways in which values are determined: parsed (i.e., the value is extracted from the RDO directly), derived (i.e., the value is determined based on some processing logic), associated (i.e., the value is associated to a kEntity or an object known to the system), or linked (i.e., the value is a link between sEntities).

In some aspects of the present disclosure, links, such as links 368-*a* through 368-*h*, may be employed to express actions (e.g., person entity uses a computing device entity, attacker entity targeted the computing device entity) and relationships between entities. In some aspects, links can be leveraged to ask contextual questions of the data in terms of the relationships between entities, which in turn can help more effectively display data about the EODF in the UI. In some cases, each of the links 368-*a* through 368-*h* may be associated with a link type. Some non-limiting examples of link types include ‘Attacked’, ‘Targeted’, ‘Detected’, Used', ‘LoggedIn’, or ‘LoggedOut’, as shown and described in relation to FIGS. 6 and 7. In some embodiments, links represented in the entity-related data may be searchable via a query language. In some cases, links may be represented in a “parent” to “child” direction (i.e., where the parent entity acted on the child entity or had some relationship with the child entity). In one non-limiting example, a user may be able to search for links between entities using a query language. For instance, links between entities can be searched in the general format of [Entity].[Link].[Entity]. Furthermore, when specifying the entity, properties of the entity can be used to be more specific around which entities should be returned by the system 301. As an example, a user may search for a computing device having a particular IP address that attacked one or more machines whose IP address begins with ‘10’, as follows: Machine.IP.Equals(“66.3.45.1”).Attacked.Machine.IP.Like(“10.*.*.*).

In some other cases, the query language may also enable a user to search for any entities of a specific type, by simply omitting any property criteria. For example, the following query language filter may be used to search for any computing device (or machine) attacked by a specific IP address, e.g., Machine.IP.Equals(“66.3.45.1”). Attacked. Machine.

Figure 3C:
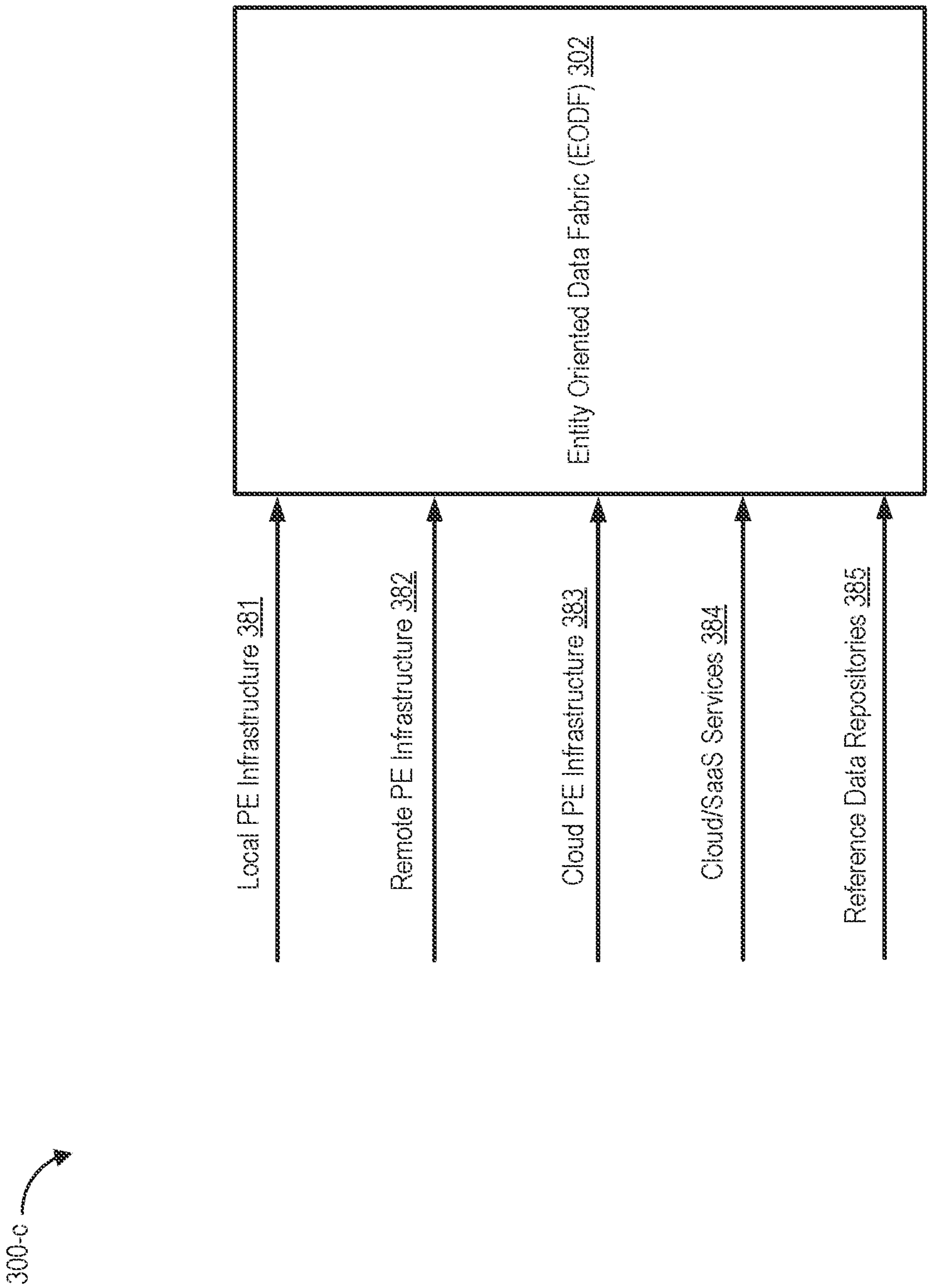
FIG. 3C illustrates an example of a plurality of sources of data that can be input into the EODF, in accordance with various aspects of the disclosure.

FIG. 3C illustrates an example (300-*c*) showing a plurality of sources of data that can be input into an EODF 302, in accordance with various aspects of the disclosure. The EODF 302 may be similar or substantially similar to any of the EODFs described herein, including at least EODF 302 described with reference to FIG. 3A. In some cases, the EODF 302 is configured to receive information or data from a plurality of sources of data. For example, as shown in FIG. 3C, some non-limiting examples of sources of data that can be input into the EODF 302 may include local protected environment (PE) infrastructure 381, remote PE infrastructure 382, cloud PE infrastructure 383, cloud/SaaS services 384, and reference data repositories 385 (e.g., MITRE ATT@CK). Additional sources of data not shown in FIG. 3C may also be input into the EODF 302 in different embodiments, and the examples shown in FIG. 3C are not intended to limit the scope and/or spirit of the present disclosure.

Figure 4A:
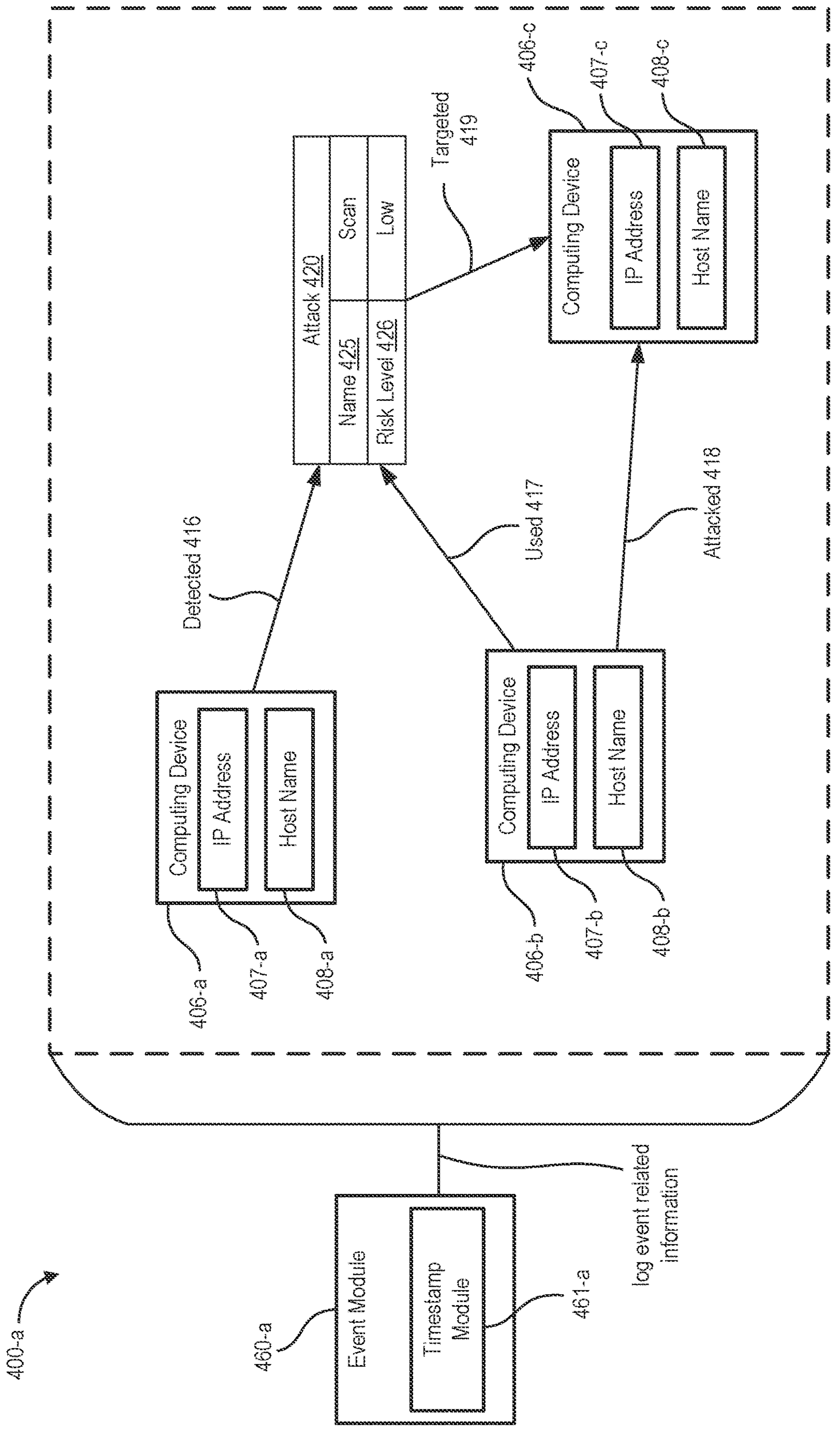
FIG. 4A illustrates a visual representation of various entity links that can be identified from an action and/or an event, in accordance with various aspects of the disclosure.

FIG. 4A illustrates a visual representation 400-*a* of various entity links that can be identified from an action and/or an event, in accordance with various aspects of the disclosure. In some aspects, links are utilized to express actions and relations between entities. By leveraging links, aspects of the disclosure facilitate a "bigger picture" view of the various entities associated with the protected environment by enabling a user to ask contextual questions of the data in terms of the relationships between entities or otherwise utilize the relationships between entities. Furthermore, links can also help more effective display of data in the UI by bringing more immediate context to the relationship of the data to the entities, which allows a user or analyst to understand more easily "what happened" or "what is happening" with the data and entities. In some cases, each link or relationship identified by the system may be assigned a link type (e.g., action link type, relation link type, occurrence link type).

Some non-limiting examples of action link types may include attacked (e.g., a first computing device was attacked by a second computing device), targeted (e.g., a first attack targeted a third computing device, or a second attack targeted a first vulnerability), detected (e.g., a fourth computing device detected a second attack), and used (e.g., a first user used a first account). Other examples of action link types may include logged in (e.g., a person or user logged into a computing device), logged out (e.g., a person or user logged out of an account or a computing device), read (e.g., an account read an object), added (e.g., a person added a new account), modified, (e.g., a user account modified an object), disabled (e.g., a first user account disabled a second user account), started (e.g., a computing device started a process, such as a software update), stopped (e.g., a computing device stopped a process, such as transferring files to an unknown computing device), spawned (e.g., a first process spawned a second, different process), sent (e.g., a computing device sent an object, a file, etc.), received (e.g., a computing device received an object, a file, etc.).

Some non-limiting examples of relation link types may include IN (e.g., a person or a computing device is IN a specific location, such as a country or state), HAS (e.g., a person or computing device HAS a specific account, a computing device HAS a specific vulnerability), LACKS (e.g., a computing device LACKS a specific vulnerability), RUNNING (e.g., a computing device RUNNING a process or service), and CONNECTED TO (e.g., a first computing device is CONNECTED TO a second computing device).

In some embodiments, the occurrence link type is used to represent when a first entity has an occurrence of a second, different entity. For example, a known entity (kEntity) may have an occurrence of a synthetic entity (sEntity). Additionally, or alternatively, an sEntity is an occurrence of a kEntity. The occurrence link type allows both of these links (i.e., is an occurrence of, has an occurrence of) to be represented, queried, etc., in accordance with various aspects of the present disclosure.

As seen in FIG. 4A, an event module 460 of the system may detect an event (e.g., a Firewall Alert; Attacked, such as, if a computing device was Attacked by another computing device; Targeted, such as, if an Attack Targeted a computing device; Detected, such as, if a computing device Detected an Attack; Used, such as, if a threat used an Attack or a computing device Used an Attack). In some cases, the timestamp module 461 of the event module 460 may also identify a timestamp (e.g., 19:21 hrs MDT on Jun. 6, 2024) associated with the Firewall Alert event. FIG. 4A also depicts a visualization of the various action and relation links related to this event. In this example, the event is associated with a plurality of action link types, namely, detected 416, used 417, attacked 418, and targeted 419, described in further detail below.

For example, FIG. 4A shows a first entity 406-*a* (or device entity 406-*a*), where the device entity 406-*a* is associated with a first IP address 407-*a* (e.g., 10.1.15.1) and a first hostname 408-*a* (e.g., rp-pa-fw01). FIG. 4A also shows a second entity 406-*b* (or device entity 406-*b*), where the device entity 406-*b* is associated with a second IP address 407-*b* (e.g., 10.1.15.50) and a second host name (e.g., rp-lws4), and a third entity 406-*c* (or device entity 406-*c*), where the third entity is associated with a third IP address 407-*c* (e.g., 10.1.15.37) and a third host name 408-*c* (e.g., rp-lws999). As seen, in this example, the device entity 406-*a* has detected (416) an attack 420, where the attack 420 was used (417) by device entity 406-*b*. Specifically, the second device entity 406-*b* attacked (418) the third device entity 406-*c* using the attack (420). Here, the attack 420 is associated with a name 425 (e.g., Scan) and a Risk Level 426 (e.g., Low Risk). Furthermore, FIG. 4A also shows that the attack 420 targeted 419 the third entity 406-*c*.

In some cases, an event may be associated with a plurality of link types, for instance, action link types (e.g., detected, used, spawned) and relation link types (e.g., running), as described below with reference to FIG. 4B.

Figure 4B:
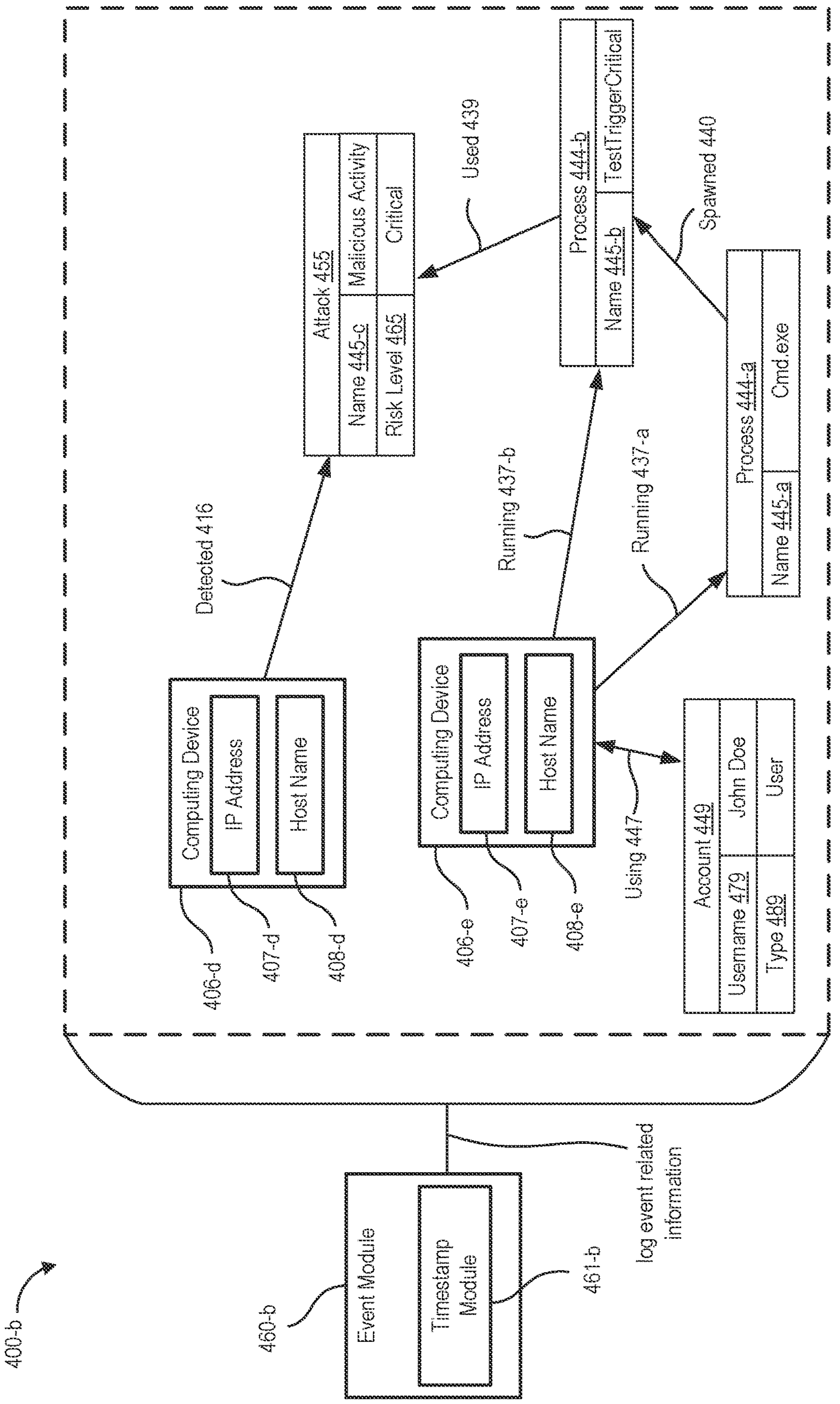
FIG. 4B illustrates a visual representation of various entity links that can be identified from an action and/or an event, in accordance with various aspects of the disclosure.

As seen in FIG. 4B, an event module 460-*b* of the system may detect an event (e.g., an Endpoint Detection and Response or EDR Event). Additionally, the timestamp module 461-*b* of the event module 460-*b* may identify a timestamp (e.g., 19:47 hrs MDT on Jun. 6, 2024) associated with the EDR event. FIG. 4B also depicts a visualization of the various action and relation links related to this event. For example, FIG. 4B shows a first entity (e.g., computing device 406-*d*), where the computing device 406-*d* is associated with a first IP address 407-*d* (e.g., 10.1.15.5) and a first hostname 408-*d* (e.g., rad-cs-edr). FIG. 4B also shows a second entity, such as computing device 406-*e*, where the computing device 406-*e* is associated with a second IP address 407-*e* (e.g., 10.1.15.5) and a second host name (e.g., rp-lws4), and a third entity (e.g., account 449), where the third entity is associated with a username 479 (e.g., John Doe) and an account type 489 (e.g., user). As seen, in this example, the first computing device 406-*a* has detected 416 an attack 455, where the attack 455 was used 439 by a process 444-*b*. Furthermore, as shown, the second computing device 406-*a* is running 437-*a* a first process 444-*a* and running 437-*b* the second process 444-*b*. Here, the first process 444-*a* is associated with a first name 445-*a* (e.g., cmd.exe) and the second process 444-*b* is associated with a second name 445-*b* (e.g., TestTriggerCritical). Furthermore, the first process 444-*a* spawned (440) the second process 444-*b*, which was subsequently used for the attack 455. In this example, the attack 455 is associated with a name 445-*c* (e.g., Malicious Activity) and a risk or severity level 465 (e.g., Critical).

Thus, as shown and described with reference to FIGS. 4A-4B, the system(s) 100 and/or 301 of the present disclosure are configured to identify one or more links/relationships for one or more of the plurality of entities (e.g., accounts, computing devices or machines, processes, etc.) associated with a protected environment. In some cases, the data store (e.g., data store 323) is utilized to store information related to the plurality of entities, the first data (or raw data), each relationship or link for each of the plurality of entities, and the processed objects (i.e., RDOs along with contextualized attributes of the RDOs). In some cases, creating the EODF (e.g., EODF 302 in FIG. 3A) is based at least in part on storing the first information. The EODF comprises a data framework for providing a unified view of at least the plurality of entities and each relationship/link for each of the plurality of entities. In some aspects, creating the entity-oriented data fabric facilitates one or more of discovering one or more compromised entities amongst the plurality of entities, identifying, from the plurality of entities, one or more entities whose likelihood of being compromised exceeds a pre-defined threshold, and preventing at least one of the plurality of entities from being compromised, described in further detail below.

In some embodiments of the present disclosure, the system (e.g., system 100 in FIG. 1) may support a query language structure that allows a user to specify a filter (e.g., to query the data store for one or more processed objects associated with the filter) or specify an operation to perform a particular action (e.g., aggregate data) on the processed objects returned by the system. In some cases, objects (e.g., RDOs, processed objects) may be searchable and may comprise a token and/or a name. Some non-limiting examples of objects include data streams (e.g., Apache Access Logs, O365 Authentication Logs), entities, and features, although other types of objects are also contemplated in different embodiments. In some cases, the token may serve as the unique identifier for an object within the system. Furthermore, the object name may serve as the display name for the object, i.e., as displayed within a UI. While not necessary, in some examples, the system may automatically generate the token (e.g., john-elway) from the name (e.g., John Elway). The system's query language may also support Boolean expressions (e.g., AND, OR), in some embodiments.

In some cases, the system may allow a user to filter search results based on inputting a synthetic entity feature (e.g., Machine.IPAddress.Equals("10.1.1.1"), which returns one or more objects with an sEntity having an IP Address equal to 10.1.1.1. In some other cases, a user can search for objects having a particular feature, such as a domain name. For instance, the user may search the data store for objects with a domain feature (associated with an sEntity), where the feature value="radicl.io". In some embodiments, the user may also search for objects based on a linked synthetic entity. For instance, a user can search for objects associated with a synthetic entity (e.g., computing device) having a specific IP address (e.g., IP address=10.1.1.1), where the synthetic entity (i.e., computing device entity) is associated with a person entity who logged into that computing device entity. In some embodiments, a user can also filter objects based on inputting a property (e.g., name of a known person, name of a known person in the Finance department) of a known entity (kEntity).

In some aspects, the search experience provided by the system of the present disclosure to an end-user is enhanced by uniform feature enrichment (UFE) and/or entity attribution. As previously noted, a processed object may comprise an RDO that has been processed via UFE. Furthermore, the processed object may contain a collection of features and/or contexts, along with the RDO (e.g., a log message). In some cases, a feature of a processed object may refer to a specific data attribute (e.g., IP address, username, etc.) that has been extracted from the RDO. Furthermore, a processed object data set may comprise one or more processed objects returned in response to a user query for presentation in a UI on a computing device.

In some cases, the system of the present disclosure also supports a plurality of search scopes/criteria, which enables a user to narrow down the search results displayed in the UI. It should be noted that returning the search results (e.g., as a visualization, a graph, a table, or another applicable format) may be based at least in part on creating the EODF in the protected environment. Some non-limiting examples of the search scopes/criteria that can be utilized include a tenant scope (e.g., limit search results to a particular enterprise or client, limit search results to a particular subdivision or organization within an enterprise), a DataStream scope (e.g., return search results associated with Apache Access Logs or Office 365 Authentication Logs), and/or a date-time scope (e.g., return search results associated with a date range, any date after a particular date, any date before a particular data, a specific time period, etc.).

In some cases, the system may also allow a user to narrow down search results by inputting an entity criteria, which allows data to be searched based on associated entities and/or their contexts. Furthermore, entity criteria search scope also allows a user to scope for entities meeting a certain criteria within a tenant, scope for entities meeting a certain criteria and associated with a certain entity type. Additionally, a user can also specify criteria for contexts of entities, as well as specify criteria for certain properties of entities via the entity criteria search scope feature provided by the system of the present disclosure. Some non-limiting examples of Applicable Search Criteria/Options for Entity/Context Criteria include (1) Entity.[Token=], (2) Entity.[Context=], (3) Entity.[Tenant=].[Token=], (4) Entity.[Tenant=].[Context=], (5) Entity.[Type=].[Token=], and (6) Entity.[Type=].[Context=].

In some examples, all (or a majority of) the searches may be bounded within a defined schema. In some cases, the schema scope may be automatically determined by the system based upon a user's specified preference(s). Alternatively, the schema scope may be automatically determined based on the workflow from whence a search originates. One non-limiting example of an applicable search criteria for a schema scope may include Schema. Token.

In some cases, the system may also support a search scope, herein referred to as a feature/context criteria search scope. In some instances, the specified schema may determine which features are available as criteria. In such cases, the feature/context criteria search scope enables a user to filter search results based on one or more of a token, a value, and a context of a feature. Some non-limiting examples of Applicable Search Criteria/Options for Feature/Context Criteria include (1) Feature.[Token=].[Value=], (2) Feature.[Context=], (3) Feature.[Context=].[Token=].[Value=].

The system may also support Boolean logic within search expressions, e.g., expression=(Tenant] AND [DataStream]

AND [Datetime] AND [Schema]) AND (([Feature criteria] AND [Feature criteria) OR ([Entity criteria] OR [Entity criteria])).

In some examples, standard value types may be defined and enforced by the system 100 (or system 301). The types may serve to determine the operations that are available for a given field when specifying criteria and in downstream analytic operations. Some non-limiting examples of value types may include token (e.g., a unique string-based key for an object stored in the data store), string, decimal, integer, IP address, although other value types may be supported in different embodiments.

In some cases, entity attribution may enable the system (e.g., system 100, system 301) to associate known entities (kEntities) and synthetic entities (sEntities) in the objects, such as the processed objects, stored in the data store (e.g., data store 323). In some cases, kEntities and sEntities may be represented using the same or substantially the same item/property architecture. Furthermore, kEntities may be persisted in a serialized JavaScript Object Notation (JSON) format. In some circumstances, some entities can be uniquely identified with a high confidence (e.g., a confidence level exceeding a pre-defined threshold) based on properties that have low cardinality (i.e., a low number of elements in a set or grouping, as a property of that grouping, where the term "low number" implies that the number of elements is less than a pre-defined threshold) within a domain or namespace scope (e.g., usernames). Additionally, or alternatively, entities can be uniquely identified with a high confidence if the entity to property relationship is fairly static (i.e., the property has a low likelihood of shifting to another entity). Some non-limiting examples of such static properties may include a MAC address assigned to a physical Network Interface Card (NIC), email addresses assigned to users, phone numbers associated with users, a unique student ID, etc. In some cases, some entities can also be uniquely identified based on their association with other entities. As an example, if the system obtains data related to an email account, the system may be configured to identify at least two entities, where a first entity may comprise the email account and the second entity may comprise the person assigned to the email account. Furthermore, since an email address/account is highly static and unique within an enterprise scope, if data related to the same email address/account is again obtained by the system (i.e., at a later point in time), the system 100 may be configured to attribute the same/previously identified person to a synthetic person entity and create a parent-child link for the synthetic person entity and the known email account entity.

In some embodiments, the system 100 and/or 301 is configured to identify one or more first properties of at least one entity type that can be used to form a strong key (i.e., a key that meets pre-defined criteria of low cardinality and being highly static). The system 100 may also identify one or more second properties of at least one entity type that can be used to form a weak key (i.e., a key that exhibits low cardinality but is temporarily static). In some cases, weak keys may be assigned to a first entity for a first period of time, but may shift to a second, different entity for a second period of time, where the first and second periods do not overlap. In one non-limiting example, a dynamically assigned IP address may serve as a weak key. It should be noted that other types of weak keys besides dynamically assigned IP addresses are contemplated in different embodiments.

In some examples, the system 100 and/or system 301 is configured to form one or more strong keys and one or more weak keys for each entity, where forming the one or more strong keys and the one or more weak keys may be based at least in part on processing the plurality of objects (e.g., RDOs). Furthermore, the system may be configured to designate, for each entity, a single strong key as a primary strong key. Additionally, the primary strong key may be used for synthesizing (i.e., generating) new entities and may serve as the "strongest" key to all other keys (i.e., both strong and weak keys). In some circumstances, the system 100 and/or system 301 is also configured to automatically search the data store (e.g., data store 323) for previously observed entity-to-key links. In such cases, if the system finds a link for a strong key, the link can be attributed to an existing or known entity.

In some cases, the system 100 and/or system 301 may find a link for one of the weak keys. In such cases, the system 301 may or may not attribute the link to the entity, based on a time stamp and entity uniqueness, to name two non-limiting examples. As an example, if the system finds two (2) possible entities that a link can be attributed to, the system may associate both the entities to the link with a low level of confidence. However, if the system finds a larger number of entities (e.g., 10 entities, 20 entities, 50 entities, etc.) that a link can be attributed to, the system may not associate any of those entities to the link.

In some cases, the system 100 and/or system 301 is configured to create a new entity, for instance, if one of the strong key is primary and no entity-to-key links were found in the data store. Furthermore, the system 301 is configured to store strong key to weak key associations in the data store, such as data store 323, and use these associations to determine the strength and/or resilience of using the weak key for association, for instance, when a strong key does not exist.

As used herein, linked entity attribution may refer to the process used for creating and/or updating entity-to-entity links based on identifying one or more of a parent entity for a child entity or vice-versa. As noted above, the system 301 (or platform 301) may utilize parent to child entity relationships in the structure of the processed objects. Furthermore, in some cases, a child entity can be used to uniquely identify a parent entity. As an example, a person may have a linked account of type 'Email Address'. Since email addresses are typically static, if the system 301 obtains data related to that email address, the system 301 may also assume that the obtained data is related to the person assigned that email address. In one non-limiting example, the system 301 may be configured to identify an email address or user account as a child entity of another entity (e.g., a person entity), in which case the person entity is the parent entity of the user account or email address entity. In some cases, if a child entity is resolved via a strong key, the system 301 is configured to search for parent entities within entity-to-entity links stored in the data store 323. In such cases, if no parent entities are found and at least one child entity having a strong key is found, the system 301 is configured to create a new parent entity and populate the new entity with all available properties, where the properties may be based at least in part on the properties of the child entity. In some other cases, if the system finds at least one parent entity and at least one child entity having a strong key was found, the system 301 is configured to update the corresponding entity-to-entity link with the current date.

Some non-limiting examples of entities and their associated entity keys may include (1) entity=Account; entity keys=username or email, where the full username may be identified as a strong primary key, (2) entity=person; entity keys=last name, first name, and/or phone number, (3)

entity=computing device; entity keys=name of computing device, MAC address of computing device, host name of computing device, and/or IP address of computing device, (4) entity=vulnerability; entity key=Common Vulnerabilities and Exposures (CVE) ID.

FIG. 6 illustrates examples of various links and query language structure that can be used to search for one or more entities having a particular link to one or more other entities, in accordance with various aspects of the disclosure.

FIG. 7 illustrates examples of various links and query language structure that can be used to search for one or more entities having a particular link to one or more other entities, in accordance with various aspects of the disclosure.

FIG. 8 illustrates examples of processed object data stream items, including their properties, value types, value determination, and query language (QL) syntax, in accordance with various aspects of the disclosure.

FIG. 9 illustrates examples of processed objects event items, including their properties, value types, value determination, and QL syntax, in accordance with various aspects of the disclosure.

FIG. 10 (shown over multiple pages) illustrates examples of entities/items, their properties, value types, value determination, linked values (if applicable), and QL syntax, according to various aspects of the disclosure.

FIG. 11 illustrates examples of properties, types, value determination, and QL syntax for processed object observation items (i.e., observation items of EODOs or EEDOs), in accordance with various aspects of the disclosure.

FIG. 12 illustrates examples of properties, types, value determination, and QL syntax for processed object observation rule items (i.e., observation rule items of EODOs or EEDOs), in accordance with various aspects of the disclosure.

FIG. 13 illustrates examples of properties, types, value determination, and QL syntax for processed object observation rule criteria (i.e., observation rule criteria for EODOs or EEDOs), in accordance with various aspects of the disclosure.

Figure 5:
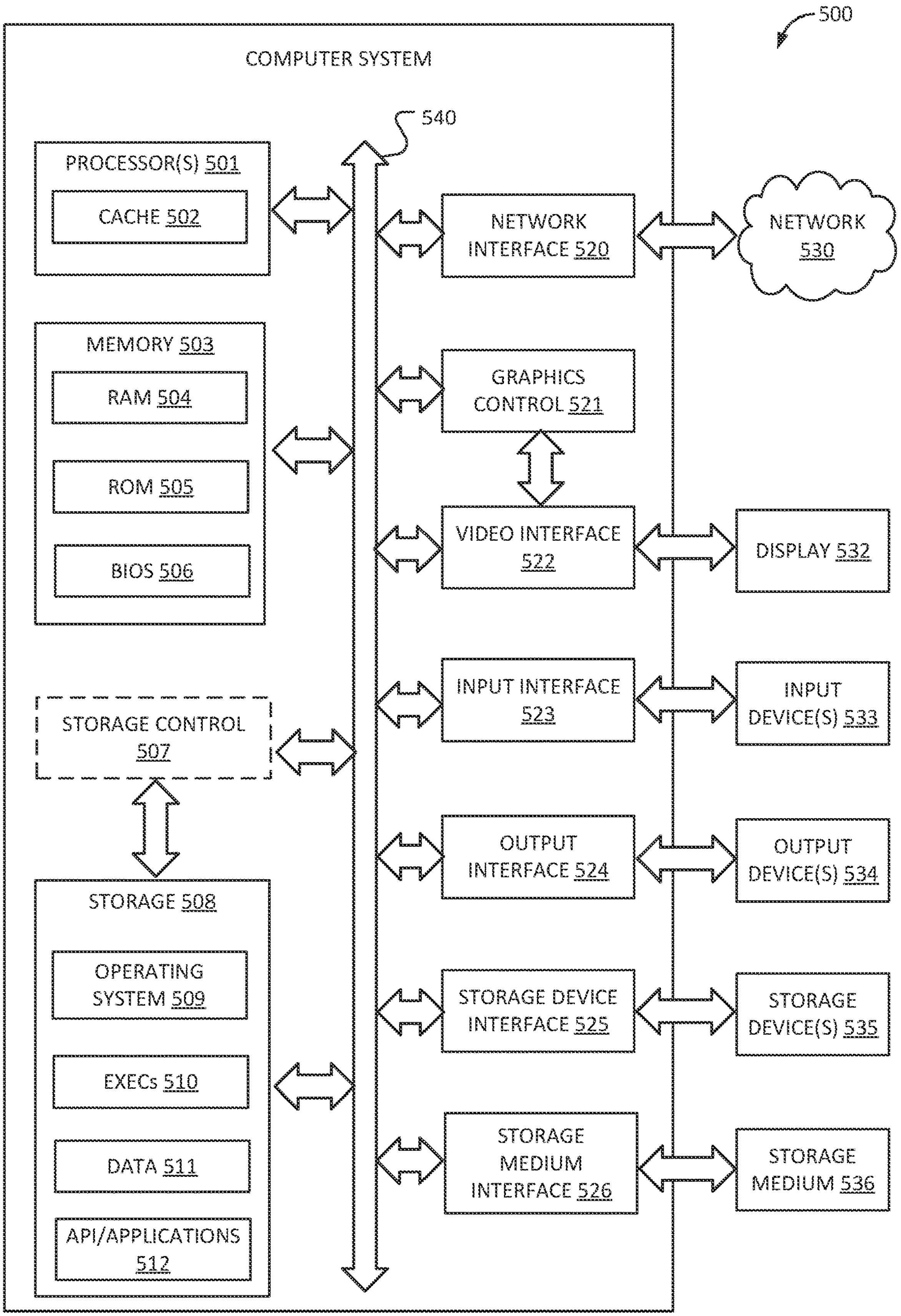
FIG. 5 illustrates a diagrammatic representation of a computer system configured for creating an EODF for a protected environment using a computing platform, in accordance with various aspects of the disclosure.

FIG. 5 illustrates a diagrammatic representation of one embodiment of a computer system 500, within which a set of instructions can execute for causing a device to perform or execute any one or more of the aspects and/or methodologies of the present disclosure. Specifically, but without limitation, the computer system 500 is configured to create an entity-oriented data fabric (EODF) in a protected environment using a computing platform, in accordance with one or more implementations. The components in FIG. 5 are examples only and do not limit the scope of use or functionality of any hardware, software, firmware, embedded logic component, or a combination of two or more such components implementing particular embodiments of this disclosure. Some or all of the illustrated components can be part of the computer system 500. For instance, the computer system 500 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 500 includes at least a processor 501 such as a central processing unit (CPU) or a graphics processing unit (GPU) to name two non-limiting examples. Any of the subsystems described throughout this disclosure could embody the processor 501. The computer system 500 may also comprise a memory 503 and a storage 508, both communicating with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various non-transitory, tangible computer-readable storage media 536 with each other and/or with one or more of the processor 501, the memory 503, and the storage 508. All of these elements may interface directly or via one or more interfaces or adaptors to the bus 540. For instance, the various non-transitory, tangible computer-readable storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer-readable instructions stored on at least one non-transitory, tangible computer-readable storage medium. Computer system 500 may provide functionality as a result of the processor(s) 501 executing software embodied in one or more non-transitory, tangible computer-readable storage media, such as memory 503, storage 508, storage devices 535, and/or storage medium 536 (e.g., read only memory (ROM) 505). Memory 503 may read the software from one or more other non-transitory, tangible computer-readable storage media (such as mass storage device(s) 535, 536) or from one or more other sources through a suitable interface, such as network interface 520. Any of the subsystems herein disclosed could include a network interface such as the network interface 520. The software may cause processor(s) 501 to carry out one or more processes or one or more steps of one or more processes described or illustrated herein, such as the method(s) 200 described in relation to FIGS. 2A-2E. Carrying out such processes or steps may include defining data structures stored in memory 503 and modifying the data structures as directed by the software. In some embodiments, an FPGA can store instructions for carrying out functionality as described in this disclosure. In other embodiments, firmware includes instructions for carrying out functionality as described in this disclosure.

The memory 503 may include various components (e.g., non-transitory, tangible computer-readable storage media) including, but not limited to, a random-access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable non-transitory, tangible computer-readable storage media. In some instances, ROM 505 and RAM 504 include non-transitory, tangible computer-readable storage media for carrying out a method, such as method(s) 200 described in relation to FIGS. 2A-2E. In one example, a basic input/output system (BIOS) 506, including basic routines that help to transfer information between elements within computer system 500, such as during start-up, may be stored in the memory 503.

Fixed storage 508 is connected bi-directionally to processor(s) 501, optionally through storage control unit 507. Fixed storage 508 provides additional data storage capacity and may also include any suitable non-transitory, tangible computer-readable media described herein. Storage 508 may be used to store operating system 503, EXECs 510 (executables), data 511, API applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503. In one non-limiting example, the data store 323 described in relation to FIG. 3A may implement one or more aspects of the storage 508.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen and/or a stylus in combination with a touch screen, and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, such as mobile devices, IoT devices, servers, and/or enterprise systems, connected to network 530. Communications to and from computer system 500 may be sent through network interface 520. For example, network interface 520 may receive incoming communications (such as requests or responses from other devices, for instance, user instructions or commands, query requests, etc., from a user device) in the form of one or more packets (such as Internet Protocol (IP) packets) from network 530, and computer system 500 may store the incoming communications in memory 503 for processing. Computer system 500 may similarly store outgoing communications (such as requests or responses to other devices, a response to a user's query request, a request to the data store for entity-to-entity links based on identifying a child or parent entity, etc.) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology known and/or contemplated in the art may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, etc. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition, or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit or IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory (e.g., RAM 504), flash memory, ROM memory (e.g., ROM 505), EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor 501 (also shown as processor 134 in FIG. 1) such that the processor 501 can read information from, and write information to, the non-transitory, tangible computer-readable storage medium. In the alternative, the non-transitory, tangible computer-readable storage medium may be integral to the processor 501. The processor 501 and the non-transitory, tangible computer-readable storage medium may reside in an ASIC. In some examples, the ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 500 shown in FIG. 5 such as, but not limited to, the network 530, processor 501, memory 503, etc., may comprise a cloud computing system. In one such system, front-end systems such as input devices 533 may provide information to back-end platforms such as servers (e.g., computer system (s) 100 and/or 500, etc.) and storage (e.g., memory 503). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Processor 501, also shown as processor 134 in FIG. 1, may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 501 may be configured to operate a memory array using a memory controller. In other cases, a memory controller may be integrated into the processor. The processor 501 or processor 134 may be configured to execute computer-readable instructions stored in memory to perform various functions (e.g., functions or tasks supporting creation of an EODF in a protected environment, such as an enterprise network). Memory 503, also shown as electronic storage 132 in FIG. 1, may include random access memory (RAM) and read only memory (ROM). The memory may store computer-readable, computer-executable software including instructions that, when executed, cause the processor 501 to perform various functions described herein. In some cases, the memory may contain, among other things, a basic input/output system (BIOS) which may control basic hardware and/or software operation such as the interaction with peripheral components or devices.

Software may include code to implement aspects of the present disclosure, including code for creating and/or managing an EODF using a computing platform (e.g., system 100 in FIG. 1, system 301 in FIG. 3A). Software may be stored in a non-transitory computer-readable medium such as system memory or other memory. In some cases, the software may not be directly executable by the processor but may cause a computer (e.g., when compiled and executed) to perform functions described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system wherein, the system is configured for creating an entity-oriented data fabric for a protected environment (PE) using a computing platform, the system comprising:

one or more hardware processors configured by machine-readable instructions to:

identify a plurality of entities associated with the PE;

obtain first data from the PE, wherein the first data is associated with at least one entity of the plurality of entities;

identify, for each of the plurality of entities, a relationship with at least one other entity of the plurality of entities, wherein the relationship is identified at least in part on the first data;

create a plurality of entity-oriented data objects, wherein each of the plurality of entity-oriented data objects is created by extracting raw data messages containing analytic values and associated with one or more entities of the plurality of entities and at least a portion of the first data;

store first information related to the plurality of entities, the first data, each relationship with at least one other entity, and the plurality of entity-oriented data objects;

create the entity-oriented data fabric, based at least in part on storing the first information, wherein the entity-oriented data fabric comprises a data framework for providing a unified view of at least the plurality of the entities and each relationship, and wherein creating the entity-oriented data fabric facilitates:

discovering one or more compromised entities amongst the plurality of entities, identifying one or more threats in the PE, identifying one or more weaknesses in the PE, and one or more of:

workflow execution, based at least in part on passing the plurality of entities into automated workflows, cataloging one or more entities of interest related to manual workflows, identifying, from the plurality of entities, one or more entities whose likelihood of being compromised exceeds a pre-defined threshold, and preventing at least one of the plurality of entities from being compromised; and provide at least a portion of the first information on a computing device, wherein the providing comprises providing one or more of a visualization, a graph, and a table via a user interface (UI) on the computing device.

2. The system of claim 1, wherein, the automated workflows create and evolve mappings; and the mappings are evolved based on access to a data set comprising, one or more disparate environments, and an accuracy determination of the automatically created mappings.

3. The system of claim 1, wherein the plurality of entities comprises:

a first set of entities operating within, and with the PE; and a second set of entities that are external to the PE.

4. The system of claim 3, wherein the first set of entities comprises a user entity, an email inbox entity, a user account entity, a computing device entity, a server entity, a virtual machine entity, and an Internet of Things (IOT) device entity.

5. The system of claim 3, wherein the second set of entities includes one or more entities selected from a group consisting of:

a cloud service infrastructure associated with at least one cloud service provider, an Information Technology (IT) infrastructure associated with at least one customer, an Operational Technology (OT) infrastructure, a supply chain IT infrastructure associated with the at least one customer, and information extracted from one or more reference databases, the one or more reference databases comprising one or more of a vulnerability database and a MITRE ATT&CK database.

6. The system of claim 3, wherein the second set of entities includes at least one entity comprising one of a malicious entity and an attacker entity, wherein the at least one of a malicious entity and an attacker entity is selected from a group consisting of:

at least one malicious hacker, a computing device associated with the at least one malicious hacker, cloud service infrastructure utilized by the at least one malicious hacker, one or more known threat actors, a malware program, a software program, a program or code to exploit a software vulnerability or security flaw, a nation-state adversary, an Information Technology (IT) environment vulnerability, an Operational Technology (OT) environment vulnerability, a Cloud environment vulnerability, one or more configuration weaknesses, and one or more known security vulnerabilities.

7. A method for creating an entity-oriented data fabric for a protected environment (PE), the method comprising:

identifying a plurality of entities associated with the PE;

obtaining first data from the PE, wherein the first data is associated with at least one entity of the plurality of entities;

identifying, for each of the plurality of entities, a relationship with at least one other entity of the plurality of entities, wherein the relationship is identified at least in part on the first data;

creating a plurality of entity-oriented data objects, wherein each of the plurality of entity-oriented data objects is created by extracting raw data messages containing analytic values and associated with one or more entities of the plurality of entities and at least a portion of the first data;

storing first information related to the plurality of entities, the first data, each relationship with at least one other entity, and the plurality of entity-oriented data objects;

creating the entity-oriented data fabric, based at least in part on storing the first information, wherein the entity-oriented data fabric comprises a data framework for providing a unified view of at least the plurality of the entities and each relationship, and wherein creating the entity-oriented data fabric facilitates:

discovering one or more compromised entities amongst the plurality of entities, identifying one or more threats in the PE, identifying one or more weaknesses in the PE, and one or more of:

workflow execution, based at least in part on passing the plurality of entities into automated workflows, cataloging one or more entities of interest related to manual workflows, identifying, from the plurality of entities, one or more entities whose likelihood of being compromised exceeds a pre-defined threshold, and preventing at least one of the plurality of entities from being compromised; and providing at least a portion of the first information on a computing device, wherein the providing comprises providing one or more of a visualization, a graph, and a table via a user interface (UI) on the computing device.

8. The method of claim 7, wherein the plurality of entities comprises:

a first set of entities operating within, and with the PE; and a second set of entities that are external to the PE.

9. The method of claim 8, wherein the first set of entities includes one or more entities selected from a group consisting of:

a user, an email inbox, a user account, a computing device, a server, and a virtual machine.

10. The method of claim 8, wherein the second set of entities includes one or more entities selected from a group consisting of:

a cloud service infrastructure associated with at least one cloud service provider, an Information Technology (IT) infrastructure associated with at least one customer, an Operational Technology (OT) infrastructure, a supply chain IT infrastructure associated with the at least one customer, and information extracted from one or more reference databases, the one or more reference databases comprising one or more of a vulnerability database and a MITRE ATT&CK database.

11. The method of claim 8, wherein the second set of entities includes at least one entity comprising one of a malicious entity and an attacker entity, wherein the at least one of a malicious entity and an attacker entity is selected from a group consisting of:

at least one malicious hacker, a computing device associated with the at least one malicious hacker, cloud service infrastructure utilized by the at least one malicious hacker, one or more known threat actors, a malware program, a software program, a program or code to exploit a software vulnerability or security flaw, a nation-state adversary, one or more known security vulnerabilities, an Information Technology (IT) environment vulnerability, an Operational Technology (OT) environment vulnerability, a Cloud environment vulnerability, and one or more configuration weaknesses.

12. The method of claim 7, wherein:

obtaining the first data from the PE comprises extracting one or more contextualized features from the first data; and extracting the contextualized features comprises one or more of:

inherent feature extraction, the inherent feature extraction comprises extracting second information related to at least one of an Internet Protocol (IP) address, a Media Access Control (MAC) address, a username, a phone number, a vulnerability identifier, an attack identifier, a threat identifier, cloud infrastructure properties, and a domain name, and derived feature extraction, the derived feature extraction comprises extracting second data related to, but not included in, the first data, the second data being different from the second information.

13. The method of claim 12, wherein, creating a plurality of entity-oriented data objects is based at least in part on obtaining the first data from the PE; and each of the plurality of entity-oriented data objects includes, at least a portion of the first data, and one or more of the extracted contextualized features.

14. The method of claim 7, wherein, the entity-oriented data fabric, the first information, and the plurality of entity-oriented data objects are configured to reside within a searchable data store; and the entity-oriented data fabric further includes third information related to at least one of:

one or more vulnerability reports, one or more threat intelligence reports, a respective attribute of one or more of the plurality of entity-oriented data objects, and a respective contextualized attribute of one or more of the plurality of entity-oriented data objects.

15. The method of claim 14, further comprising receiving a request for retrieving, from the entity-oriented data fabric, fourth information, wherein the fourth information comprises information related to one or more of a first entity, a first object, a first vulnerability report, a first threat intelligence report, an attribute of the first object, and a contextualized attribute of the first object.

16. The method of claim 7, wherein, the relationship is further identified, at least in part, by:

determining at least one of one or more strong keys and one or more weak keys for at least a portion of the plurality of entities;

each of the one or more strong keys is static for a longer duration than each of the one or more weak keys; and each of the one or more strong keys exhibits a higher level of cardinality than each of the one or more weak keys.

17. The method of claim 16, wherein the plurality of entities comprises one or more known entities and one or more synthetic entities, and further comprising:

identifying, for at least one of the one or more synthetic entities, a relationship with at least one of the one or more known entities; and identifying one or more additional links or relationships for one or more of the plurality of entities, based on assessing fifth information, wherein the fifth information comprises information related to the one or more strong keys and the one or more weak keys.

18. The method of claim 7, further comprising obtaining metadata information for at least a portion of the plurality of entities, and wherein creating the entity-oriented data fabric is based at least in part on obtaining the metadata information.

19. The method of claim 7, wherein, a compromised entity comprises an entity that has been jeopardized or attacked during an event, the compromised entity is selected from a group consisting of a user, an email address, a computing device, a software program, a user account, and a server, and the event comprises one or more of clicking on a phishing link, visiting a malicious website, installing malware on the computing device or server, installing ransomware on the computing device or server, a hacking of the email address, exploitation of a system vulnerability, theft of a user's credentials, impersonation of a user, abuse of privileges by one or more users, and a hacking of the user account.

20. A non-transient computer-readable storage medium having instructions embodied thereon, the instructions being executable by one or more processors to perform a method for creating an entity-oriented data fabric for a protected environment (PE), the method comprising:

identifying a plurality of entities associated with the PE;

obtaining first data from the PE, wherein the first data is associated with at least one entity of the plurality of entities;

identifying, for each of the plurality of entities, a relationship with at least one other entity of the plurality of entities, wherein the relationship is identified at least in part on the first data;

creating a plurality of entity-oriented data objects, wherein each of the plurality of entity-oriented data objects is created by extracting raw data messages containing analytic values and associated with one or more entities of the plurality of entities and at least a portion of the first data;

storing first information related to the plurality of entities, the first data, each relationship with at least one other entity, and the plurality of entity-oriented data objects;

creating the entity-oriented data fabric, based at least in part on storing the first information, wherein the entity-oriented data fabric comprises a data framework for providing a unified view of at least the plurality of the entities and each relationship, and wherein creating the entity-oriented data fabric facilitates:

discovering one or more compromised entities amongst the plurality of entities, identifying one or more threats in the PE, identifying one or more weaknesses in the PE, and one or more of:

workflow execution, based at least in part on passing the plurality of entities into automated workflows, cataloging one or more entities of interest related to manual workflows, identifying, from the plurality of entities, one or more entities whose likelihood of being compromised exceeds a pre-defined threshold, and preventing at least one of the plurality of entities from being compromised; and providing at least a portion of the first information on a computing device, wherein the providing comprises providing one or more of a visualization, a graph, and a table via a user interface (UI) on the computing device.

21. The non-transient computer-readable storage medium of claim 20, wherein the plurality of entities comprises:

a first set of entities operating within, and with the PE; and a second set of entities that are external to the PE.

* * * * *